US008898109B2

(12) United States Patent
Neerincx et al.

(10) Patent No.: US 8,898,109 B2
(45) Date of Patent: Nov. 25, 2014

(54) AUTOMATIC TRANSACTION RETRY AFTER SESSION FAILURE

(75) Inventors: Matthew Alban Neerincx, Sammamish, WA (US); Luiz Fernando Federico Dos Santos, Lynnwood, WA (US); Oleg Ignat, Bellevue, WA (US); David Bruce Lomet, Redmond, WA (US); Quetzalcoatl Bradley, Monroe, WA (US); Raghu Ram, Redmond, WA (US); Chadwin James Mumford, Woodinville, WA (US); Peter Gvozdjak, Bellevue, WA (US); Balendran Mugundan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 42 days.

(21) Appl. No.: 13/560,468

(22) Filed: Jul. 27, 2012

(65) Prior Publication Data
US 2014/0032491 A1    Jan. 30, 2014

(51) Int. Cl.
G06F 7/00     (2006.01)
G06F 17/00    (2006.01)

(52) U.S. Cl.
USPC ........................................................ 707/610

(58) Field of Classification Search
None
See application file for complete search history.

(56) References Cited

U.S. PATENT DOCUMENTS

| 5,826,085 | A  | 10/1998 | Bennett et al. |
| 5,951,694 | A  | 9/1999  | Choquier et al. |
| 5,960,436 | A  | 9/1999  | Chang et al. |
| 6,182,086 | B1 | 1/2001  | Lomet et al. |
| 6,199,110 | B1 | 3/2001  | Rizvi et al. |
| 6,314,455 | B1 | 11/2001 | Cromer et al. |
| 6,381,617 | B1 | 4/2002  | Frolund et al. |
| 6,453,354 | B1 | 9/2002  | Jiang et al. |
| 6,463,459 | B1 | 10/2002 | Orr et al. |
| 6,539,494 | B1 | 3/2003  | Abramson et al. |

(Continued)

FOREIGN PATENT DOCUMENTS

EP        0554854 A2    8/1993

OTHER PUBLICATIONS

"Oracle® Application Server Containers for J2EE Services Guide 10g Release 2 (10.1.2) for Windows or UNIX", Retrieved at <<http://docs.oracle.com/cd/B14099_19/web.1012/b14012/datasrc.htm>> Retrieved Date: Dec. 22, 2011, pp. 23.

(Continued)

*Primary Examiner* — Uyen Le
(74) *Attorney, Agent, or Firm* — Nicholas Chen; Kate Drakos; Micky Minhas

(57) ABSTRACT

Techniques for recovering from session failures between clients and database servers are described herein. A session may be established between a client and a first database server, and a transaction may be opened to process a plurality of database commands. One or more commands associated with the transaction may be received from the client at the database server. Each received command has an associated command identifier. A transaction log stores the command identifier associated with each received command and indicates whether each received command has been successfully executed at the database server. After a session failure, the session is reestablished, and a command identifier for a further command is received from the client. If the command identifier associated with the further command is determined to have been stored in the transaction log, the command does not need to be executed, and the transaction may continue.

20 Claims, 11 Drawing Sheets

(56) References Cited

U.S. PATENT DOCUMENTS

| | | |
|---|---|---|
| 6,704,778 B1 | 3/2004 | Horman |
| 6,778,653 B1 | 8/2004 | Kallas et al. |
| 6,801,914 B2 | 10/2004 | Barga et al. |
| 6,820,085 B2 | 11/2004 | Nishizawa et al. |
| 7,231,636 B1 | 6/2007 | Evans |
| 7,284,155 B2 | 10/2007 | Faihe et al. |
| 7,343,515 B1 | 3/2008 | Gilbertson et al. |
| 7,657,782 B2 | 2/2010 | Das et al. |
| 7,664,879 B2 | 2/2010 | Chan et al. |
| 7,693,999 B2 | 4/2010 | Park |
| 7,702,947 B2 | 4/2010 | Peddada |
| 7,716,274 B1 | 5/2010 | Kumar |
| 7,765,256 B2 | 7/2010 | Doshi et al. |
| 7,853,926 B2 | 12/2010 | Blouin et al. |
| 7,882,173 B2 | 2/2011 | Hirsch et al. |
| 7,953,883 B2 | 5/2011 | Thomas et al. |
| 8,051,180 B2 | 11/2011 | Mazzaferri et al. |
| 8,103,779 B2 | 1/2012 | Belkin et al. |
| 2002/0111949 A1 | 8/2002 | Barga et al. |
| 2002/0152430 A1 | 10/2002 | Akasaka et al. |
| 2003/0084165 A1 | 5/2003 | Kjellberg et al. |
| 2003/0145103 A1 | 7/2003 | Pruyne et al. |
| 2004/0044865 A1* | 3/2004 | Sicola et al. .................. 711/162 |
| 2004/0249948 A1 | 12/2004 | Sethi et al. |
| 2005/0240558 A1 | 10/2005 | Gil et al. |
| 2006/0075112 A1 | 4/2006 | Polozoff |
| 2006/0123098 A1* | 6/2006 | Asher et al. .................. 709/218 |
| 2006/0242286 A1 | 10/2006 | Hawkins et al. |
| 2007/0174493 A1 | 7/2007 | Irish et al. |
| 2007/0208862 A1 | 9/2007 | Fox et al. |
| 2008/0033964 A1 | 2/2008 | Richards et al. |
| 2008/0062863 A1 | 3/2008 | Ginde |
| 2008/0126831 A1 | 5/2008 | Downey et al. |
| 2008/0134138 A1 | 6/2008 | Chamieh et al. |
| 2008/0229023 A1 | 9/2008 | Plamondon |
| 2008/0301418 A1 | 12/2008 | Khailany et al. |
| 2009/0083088 A1 | 3/2009 | Mathew et al. |
| 2009/0113457 A1 | 4/2009 | Sedukhin et al. |
| 2010/0064130 A1 | 3/2010 | Borisov |
| 2010/0153702 A1 | 6/2010 | Loveless |
| 2010/0205583 A1 | 8/2010 | Gebhardt et al. |
| 2011/0055839 A1 | 3/2011 | Alexander et al. |
| 2011/0060622 A1 | 3/2011 | Piersol et al. |
| 2011/0113247 A1 | 5/2011 | Panasyuk et al. |
| 2011/0213821 A1 | 9/2011 | Gentile et al. |
| 2012/0197925 A1 | 8/2012 | Balagopalan et al. |
| 2013/0066949 A1* | 3/2013 | Colrain et al. ................ 709/203 |
| 2014/0032964 A1 | 1/2014 | Neerincx et al. |

OTHER PUBLICATIONS

"Idempotent Command Execution", U.S. Appl. No. 13/471,670, filed May 15, 2012, pp. 47.

"Virtual Session Management and Reestablishment", U.S. Appl. No. 13/527,384, filed Jun. 19, 2012, pp. 44.

"International Search Report & Written Opinion for PCT Patent Application No. PCT/US2013/052152", Mailed Date: Oct. 9, 2013, Filed Date: Jul. 26, 2013, 9 Pages.

Barga, et al., "Persistent Client-Server Database Sessions", In Proceedings of the 7th International Conference on Extending Database Technology: Advances in Database Technology, Feb. 2000, 15 pages.

Roehm, et al., "WebSphere Application Server V6 Scalability and Performance Handbook", In IBM Redbooks, May 26, 2005, 369 pages.

International Search Report & Written Opinion for PCT Patent Application No. PCT/US2013/051751, Mailed Date: Oct. 8, 2013, Filed Date: Jul. 24, 2013, 11 pages.

Sultan, et al., "Recovering Internet Service Sessions from Operating System Failures", In IEEE Internet Computing, vol. 9, Issue 2, Mar., 2005, pp. 17-27.

Lomet, et al., "Efficient Transparent Application Recovery in Client-Server Information Systems", In Proceedings of the ACM SIGMOD International Conference on Management of Data, Jun. 1998, pp. 460-471.

Balman, et al., "Early Error Detection and Classification in Data Transfer Scheduling", In International Conference on Complex, Intelligent and Software Intensive Systems, Mar. 16, 2009, pp. 457-462.

Wilbur, et al., "Building Distributed Systems with Remote Procedure Call", In Software Engineering Journal, Sep. 1987, pp. 148-159.

Barga, et al., "Measuring and Optimizing a System for Persistent Database Sessions", In 17th International Conference on Data Engineering, Apr. 6, 2001, pp. 21-30.

U.S. Appl. No. 13/086,959, filed Apr. 14, 2011, 35 pages.

Non-final Office Action Issued in U.S Appl. No. 13/471,670, Mailed Date: Dec. 18, 2013, Filed Date: May 15, 2012, 18 pages.

Non-final Office Action Issued in U.S Appl. No. 13/527384, Mailed Date: Jan. 17, 2014, Filed Date: Jun. 19, 2012, 19 pages.

U.S. Appl. No. 13/653,318, filed Oct. 16, 2012, 36 pages.

* cited by examiner

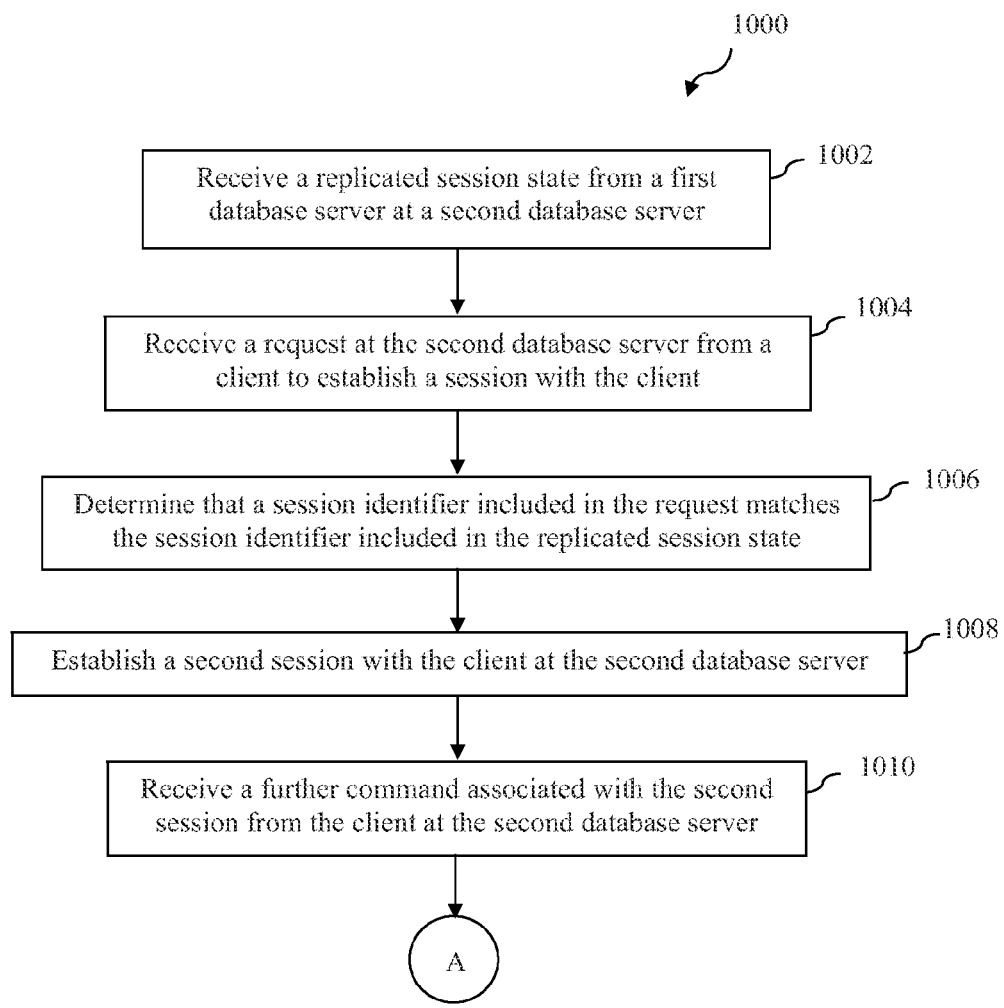

AUTOMATIC TRANSACTION RETRY AFTER SESSION FAILURE

BACKGROUND

A database server is a product that provides database services to computer applications in response to requests received therefrom. Such database services may include but are not limited to storing, retrieving, analyzing, or manipulating database data. Depending upon the implementation, the applications may be running on the same machine on which the database server is running or may be running on other machines that are connected to the machine on which the database server is running via one or more networks. To send requests to the database server, an application connects to the database server and establishes therewith what is referred to as a session. A session represents an ongoing interactive information exchange between the application and the database server. A session is set up or established at a certain point in time and then torn down at a later point in time. An established session often involves the sending of more than one message from the application to the database server and from the database server to the application.

After an application has initiated a session with a database server, a transaction may be opened between the application and server to perform a series of database operations. The transaction may be atomic such that all of the database operations occur, or none of them occur. As such, the application may send a command to the database server for execution within the context of a transaction. At some point in time, the connection that was established between the application and the database server may fail. For example, in a scenario in which the application and the database server are running on different machines, the connection may fail if the machine on which the database server is running is shut down or crashes or if there is a problem with a network that connects the different machines. If the connection fails, the session itself fails, and the transaction currently being processed by the database server fails. Due to the transaction failing, all of the operations of the transaction fail, whether or not the database server has already started processing them. As a result, the application has to implement retry logic to reattempt the entire transaction. However, retry logic is complex to implement in an application. Furthermore, when such an application is moved to a cloud environment, there are more possibilities for session failures due to the nature of cloud services. As such, the application may need to be modified to be better able to handle database access failures in the cloud.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided for recovering from a session failure between a client and a database server, and for enabling transactions that were in process during a session failure to be completed in an efficient manner. A transaction log is maintained at the database server to track the progress of executing commands inside of a transaction. If a session failure occurs between a client and a database server, and is subsequently reestablished, the transaction log may be referenced to enable the transaction to be continued from the point of failure without having to re-start the transaction from the beginning and re-execute the commands inside the transaction.

Computer program products containing computer readable storage media are also described herein that store computer code/instructions for enabling recovery from session failures, and enabling completion of transactions that were in process during a session failure, as well as enabling additional embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

FIG. 9 shows a process for replicating a session state, according to an example embodiment.

FIG. 10 depicts a flowchart of a process performed at a second database server to recover from a session failure between a first database server and a client, according to an example embodiment.

Figure 1:
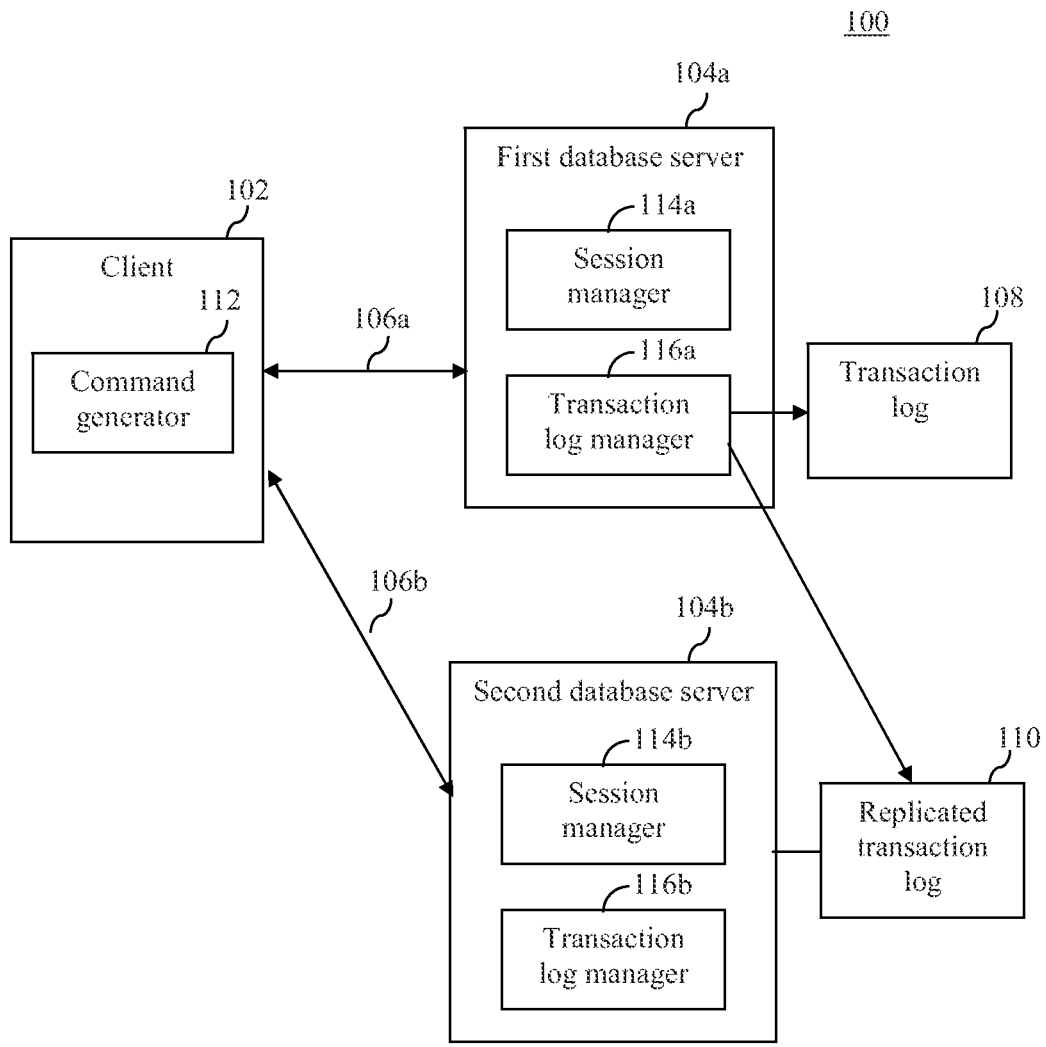
FIG. 1 is a block diagram of an example system that enables transaction completion in the event of a session failure between a client and a database server, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Embodiments described herein facilitate recovery from session failures between a client and a database server, and enable the efficient completion of transactions that were in process during such failed sessions. A transaction may be initiated by a client to implement a plurality of database commands at a database server, such as commands to store/write data, to retrieve/read data, and to update/modify stored data of a database. In an embodiment, a transaction may be an atomic transaction. According to an atomic transaction, "atomicity" is guaranteed, such that all database commands of the transaction are executed with respect to the database, or none of the database commands of the transaction are executed. Such a guarantee of atomicity prevents updates to the database from occurring partially, which can cause greater problems than rejecting the transaction in its entirety. Thus, typically, a connection failure during the processing of an atomic transaction causes the entire transaction to fail, causing all commands of the transaction to be repeated. Embodiments enable transactions that suffer connection failures to be continued from the point of failure rather than having to be retried from the beginning.

Section II describes example embodiments for conducting database queries in a manner that enables recovery from session failures. Section III describes example embodiments in which a session failure between the first database server and the client is recovered between the client and a second database server. Section IV describes an example processor-based computer system that may be used to implement various embodiments described herein. Finally, Section V provides some concluding remarks.

Although the embodiments described herein are implemented in systems that include database servers, persons skilled in the relevant art(s) will readily appreciate that the concepts described herein can easily be extended to any system in which sessions are established between a first entity to a second entity for execution of data requests, and wherein recovery from session failures is desired. Such systems may include but are not limited to any of a wide variety of client-server systems, peer-to-peer systems, or the like.

Numerous exemplary embodiments of the present invention are described as follows. It is noted that any section/subsection headings provided herein are not intended to be limiting. Embodiments are described throughout this document, and any type of embodiment may be included under any section/subsection.

II. Example Embodiments for Conducting a Session between a Client and a Database Server in a Manner that Enables Recovery FIG. 1 is a block diagram of an example system 100 that facilitates recovery from session failures, and enables transactions that were open during session failures to continue, in accordance with an embodiment. System 100 is described herein by way of illustration only and is not intended to be limiting. Persons skilled in the relevant art(s) will appreciate that embodiments described herein may be implemented in systems other than system 100.

As shown in FIG. 1, system 100 includes a client 102 that is communicatively connected to a first database server 104a via a communication channel 106a, and is communicatively connected to a second database server 104b via a communication channel 106b. Database servers 104a and 104b are intended to represent entities that perform operations with respect to data stored in one or more databases that are accessible thereto in response to receiving commands generated by clients, such as client 102, via communication channels 106a and 106b. The operations performed by each of database servers 104a and 104b may include, for example, storing, retrieving, analyzing and/or manipulating database data. Database servers 104a and 104b may each be implemented as computer programs executing on a single machine or across multiple machines. As will be appreciated by persons skilled in the relevant art(s), such machines may comprise physical machines or virtual machines. In one embodiment, database servers 104a and 104b may each be an instance of MICROSOFT SQL SERVER®, published by Microsoft Corporation of Redmond Wash. However, this is an example only and is not intended to be limiting.

In one embodiment, database servers 104a and 104b each comprise a standalone database server configured to execute commands received from one or more clients, such as client 102. In an alternate embodiment, database server 104a and 104b may be included in a plurality of database server instances running on a cluster of machines and employed to service requests from a plurality of clients, such as client 102, in a manner that allows for failover and high availability. In a further embodiment, database servers 104a and 104b may each comprise one of a plurality of database server instances used to implement a cloud database service, such as but not limited to MICROSOFT SQL AZURE™, offered by Microsoft Corporation of Redmond, Wash. In embodiments, any number of database servers similar to database servers 104a and 104b may be present, including tens, hundreds, and even greater numbers of database servers.

Client 102 is intended to represent an entity that generates and sends commands to database servers 104a and 104b for execution thereby. For example, as shown in FIG. 1, client 102 includes a command generator 112. Command generator 112 may is configured to generate an ID for each command with the transaction. Each time a command of a transaction is transmitted to a database server, the command ID for that particular command within the transaction are transmitted to the database server. An identifier for the transaction itself may be generated to identify the transaction, and may optionally be transmitted with each command ID. When a transaction is being conducted between client 102 and a database server within the scope of a session (e.g., a virtual session), a session identifier may also be generated that identifies the session, which may or may not also be transmitted with each command. Examples of commands that may be performed by a database server for a client include commands to store, retrieve, and/or modify database data.

Client 102 may be implemented as one or more computer programs executing on one or more machines. For instance, client 102 may be implemented in any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), or other type of stationary or mobile device Client 102 and database servers 104a and 104b may each be executed by different machines that are connected to each other via a particular communication infrastructure. In further accordance with such an implementation, communication channels 106a and 106b may be established in a manner that corresponds to the particular communication infrastructure. For example, in an embodiment in which the communication infrastructure comprises a network, such as a local area network (LAN), a wide area network (WAN) or a combination of networks such as the Internet, well-known networking protocols may be used to establish communication channels 106a and 106b between the client 102 and database servers 104a and 104b. As another example, in an embodiment in which database servers 104a and 104b are included in a cloud database service, communication channels 106a and 106b may be established via a gateway machine that acts as an intermediary between the machine on which client 102 is running and the machines on which database servers 104a and 104b are running. Such gateway device, when present, may enable communications between client 102 and one of database servers 104a and 104b at a particular time. Still other communication infrastructures and associated methods for establishing communication channels 106a and 106b are possible.

It is also possible that client 102 and one or both of database servers 104a and 104b may be executing on the same machine. In accordance with such an implementation, one or both of communication channels 106a and 106b may comprise a channel that is internal to the machine upon which both entities are executing.

Generally speaking, communication channel 106a and 106b are used to transport commands generated by client 102 to one or both of database servers 104a and 104b, respectively, so that database servers 104a and/or 104b may execute such commands. Database servers 104a and 104b may also return requested data, error messages, or other information to client 102 via communication channels 106a and 106b. In accordance with certain embodiments, the manner in which information is exchanged between client 102 and database servers 104a and 104b is governed by a standard application layer protocol that is supported by both entities. For example, in a particular embodiment, the application layer protocol comprises the Tabular Data Stream (MS-TDS) protocol, as defined in Version 20120328 of the Tabular Data Stream Protocol Specification, published by Microsoft Corporation of Redmond, Wash. However, this is only an example, and other protocols may be used.

In accordance with certain embodiments, to interact with database servers 104a and 104b for the purpose of invoking the database services thereof, client 102 connects to one of database servers 104a or 104b and establishes therewith what is referred to herein as a session. For instance, client 102 may connect with database server 104a to establish a session. The session represents an ongoing interactive information exchange between client 102 and database server 104a. A session may be set up or established at a certain point in time and then ended at a later point in time. During an established session, client 102 may conduct any number of transactions with database server 104a, and may send database server 104a any number of commands within each transaction. Database server 104a may return to client 102 results, error codes or other information in response to executing or attempting to execute such commands (client 102 may alternatively interact with database server 104b in a similar manner when a session is established between them). For instance, client 102 may transmit an SQL (structured query language) command to database server 104a, such as a SELECT query or other command. A SELECT query may be used to retrieve data (e.g., one or more rows and/or columns) from one or more database tables managed by a databases server. Client 102 may transmit other types of commands, including command to write data to a database (e.g., to one or more rows and/or columns of one or more tables), to modify data of a database, etc.

When database server 104a receives write and/or update commands from client 102 within an atomic transaction, database server 104a may not perform the actual writes/updates into the database until all commands of the transaction have been received. For instance, database server 104a may partially perform the commands by performing some database manipulation in temporary memory (e.g., cache memory) in preparation for making the writes/updates in the actual database. Database server 104a may also use locks (e.g., locking database records) to prevent others (e.g., other clients) from writing data into the portions of the database impacted by the commands, depending on the isolation level required by the client. When all commands of a transaction have been transmitted by client 102 to database server 104a, client 102 may transmit a commit command to database server 104a. The commit command instructs database server 104a to fully execute all of the commands of the transaction, which may cause database server 104a to actually write to and/or modify data in the database. After database server 104a fully executes all of the commands of the transaction, database server 104a may transmit a commit complete response to client 102.

As shown in FIG. 1, database server 104a includes a transaction log manager 116a, and database server 104b includes a transaction log manager 116b. Transaction log managers 116a and 116b function similarly for their respective database servers. Furthermore, additional database servers may be present that also include transaction log managers similar to transaction log managers 116a and 116b. For purposes of brevity, session manager 114a and transaction log manager 116a are described as follows, and this description is intended to be representative of the functionality of session manager 114*b* and transaction log manager 116*b* (and of further transaction log managers that may be present in other database servers).

Session manager 114*a* of first database server 104*a* establishes a session with a client, such as client, to handle a database query for the client. For instance, session manager 114*a* may receive a session identifier from the client that is used to establish a session with the client, and is used by session manager 114*a* to identify communications associated with the established session. Alternatively, session manager 114*a* may be configured to generate the session identifier for a session, and to transmit the session identifier to the client. Furthermore, session manager 114*a* enables a transaction to be opened with the client within the established session, and receives commands from the client within the scope of the transaction. Session manager 114*a* enables responses to the received commands to be transmitted to client 102, as appropriate. Session manager 114*b* functions for second database server 104*b* in a similar manner as session manager 114*a* functions for first database server 104*a*.

Transaction log manager 116*a* is configured to generate a transaction log 108. Transaction log 108 contains information representing a state of a transaction between database server 104*a* and client 102 at any particular time. As such, transaction log 108 may be used to recover a transaction-in-progress from a session failure between client 102 and database server 104*a*. Transaction log 108 may include various types of transaction information. For instance, transaction log manager 116*a* may store the transaction identifier for a transaction that is open between client 102 and database server 104*a* in transaction log 108. Furthermore, a command identifier associated with each transaction command generated by client 102 and received by database server 104*a* may be stored in transaction log 108 by transaction log manager 116*a*.

Still further, for each command of the transaction, transaction log manager 116*a* may store an indication in transaction log 108 of whether the command has been successfully executed. This means that for a command, transaction log manager 116*a* may indicate in transaction log 108 whether the command has been performed with respect to a database accessible by database server 104*a* (to the extent that the command may be performed prior to committing the transaction), and whether a response (e.g., data) was returned. For instance, for a read command, transaction log manager 116*a* may indicate whether the applicable data has been read from the database and stored in temporary storage (e.g., cache memory, etc.) and/or in transaction log 108 itself, for transmitting to client 102 after receiving the commit instruction from client 102, or whether the data has already been transmitted to the client. For a write command, transaction log manager 116*a* may indicate whether the data to be written to the database is ready to be written (e.g., is stored in temporary storage) after receiving the commit instruction from client 102, or whether the data has already been written to the database. Similarly, for a modify command, transaction log manager 116*a* may indicate whether the modify data is ready to be written to the database (e.g., is stored in temporary storage) after receiving the commit instruction from client 102, or whether the modify data has already been written to the database.

The foregoing operations of transaction log manager 116*a* enable session manager 114*a* and transaction log manager 116*a* to aid database server 104*a* (or other database server, such as database server 104*b*) in recovering from a session failure between client 102 and database 104*a*. For instance, if a session failure occurs between client 102 and database server 104*a* (e.g., due to a connection failure, a failure in database server 104*a*, etc.) resulting in a command of a transaction that is being processed not being responded to, client 102 may retransmit the command with the command identifier and identifiers for the transaction and the failed session to database server 104*a*. Database server 104*a* may reestablish the failed session, and may compare the received transaction and command identifiers with transaction log 108. If the transaction identifier for transaction log 108 matches the received transaction identifier, and the received command identifier matches a command indicated in transaction log 108, the command has already been received by database server 104*a*, and the indication of whether the command has been successfully executed may be checked. If the command has not been successfully executed, it may be executed at this time. If transaction log 108 matches the received transaction identifier, but the received command identifier does not match a command indicated in transaction log 108, the command has not previously been received by database server 104*a*, and may therefore be treated as a new command of the transaction. The failed session may be reestablished in this manner, and the transaction may be continued between client 102 and database server 104*a* from the point of the failure.

Alternatively, as described herein, another database server, such as database server 104*b*, may be provided with a copy of transaction log 108 by transaction log manager 116*a*, shown as replicated transaction log 110. If a session failure occurs between client 102 and database server 104*a* in the midst of an open transaction, client 102 may retransmit the command with the session, transaction, and command identifiers. The retransmitted command may be received by database server 104*b* rather than database server 104*a*. This may be because database server 104*a* is not operating due to a system crash or other reason. Database server 104*b* may compare the received command identifier and transaction identifier with those stored in replicated transaction log 110, and if there is a match, the command had already been received by database server 104*a*, and the indication of whether the command has been successfully executed may be checked in replicated transaction log 110. If the command is indicated as not successfully executed, it may be executed at this time by second database server 104*b*. If replicated transaction log 110 includes a match for the received transaction identifier, but the received command identifier does not match a command indicated in transaction log 108, the command was not previously received by database server 104*a*, and may therefore be treated as a new command of the transaction by database server 104*b*. The failed session may be reestablished between client 102 and database server 104*b* in this manner (rather than database server 104*a*), and continued between client 102 and database server 104*b* from the point of the failure.

More information regarding the structure, function and operation of the components of system 100 in accordance with various implementations is described as follows in regard to FIGS. 2-10.

Figure 2:
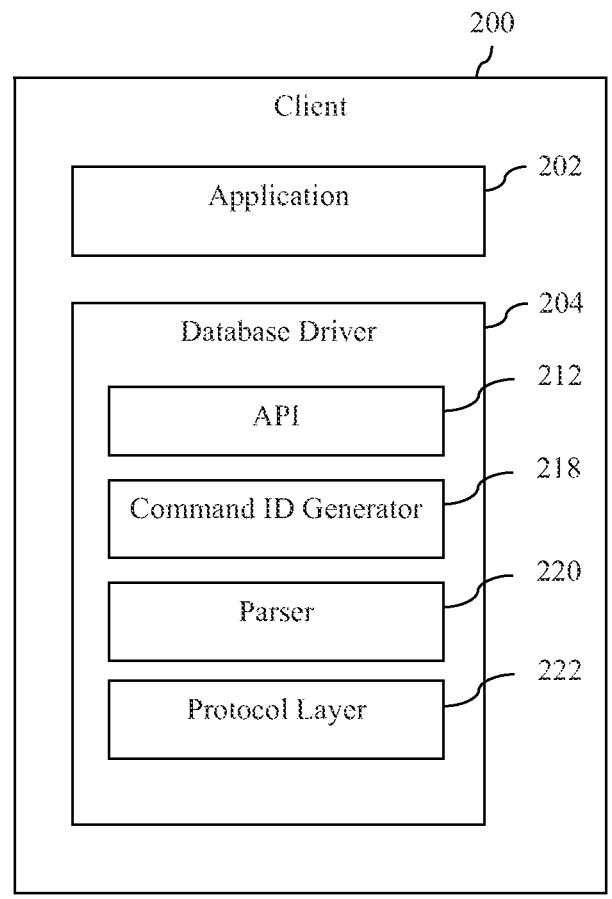
FIG. 2 is a block diagram of the client shown in FIG. 1, according to an example embodiment.

In particular, FIG. 2 is a block diagram that illustrates various elements of a client 200 in accordance with one example embodiment. Client 200 is an example of client 102 shown in FIG. 1. As shown in FIG. 2, client 200 comprises an application 202 and a database driver 204. Application 202 comprises a computer program that enables a user thereof to perform various functions, at least some of which require database operations to be performed. In order to facilitate the performance of such database operations, application 202 is programmed to interact with database driver 204. In an embodiment, application 202 may be considered to be included in client 200 (as shown in FIG. 2) or may be separate from client 200. For instance, in one embodiment, application 202 and client 200 may operate on a common computing device, and application 202 may access client 200 to communicate with a database at a database server. Application 202 may be any type of application that accesses data stored in a database (e.g., using SQL queries or other types of database requests provided to database driver 204). Database driver 204 operates to establish a connection between application 202 or any of a variety of other applications and a database server and to utilize such connection for the purpose of obtaining services from the database server.

In one embodiment, database driver 204 provides an application programming interface (API) 212 that can be used by any of a variety of applications to invoke the functionality thereof. As further shown in FIG. 2, database driver 204 also includes a command ID generator 218, a parser 220, and a protocol layer 222. Command ID generator 218 forms an example of command generator 112 of FIG. 1. The features of FIG. 2 are described as follows.

Command ID generator 218 is configured to generate an ID for each command that is generated by client 200 for transmission to and execution by a database server within the scope of a transaction. In one embodiment, command ID generator 218 generates a unique ID for each command so generated. When client 200 sends a command to a database server, client 200 also sends the command ID associated with that command to the database server (and optionally includes the associated transaction identifier and session identifier). For example, in one embodiment, a command and its corresponding command ID are included within the same message that is transmitted from client 200 to a database server.

Parser 220 is configured to encode commands to be sent to a database server and to interpret information received therefrom in accordance with a particular application layer protocol, such as but not limited to MS-TDS. In one embodiment, protocol layer 222 is intended to represent one or more computer programs executing in hardware (e.g., one or more processors) utilized by database driver 204 to carry encoded commands produced by parser 220 to a database server and to receive encoded information therefrom.

In accordance with the embodiment shown in FIG. 2, the functions performed by session ID generator 328 and command ID generator 218 are performed at the level of database driver 204 rather than at the level of application 202. This is advantageous in that it can relieve programmers of applications that are designed to invoke database driver 204, such as application 202, from having to program features into their applications that are intended to recover from transaction and session failures. Additionally, by incorporating such functionality at the database driver level rather than the application level, embodiments described herein can advantageously reduce the complexity of such applications.

Figure 3:
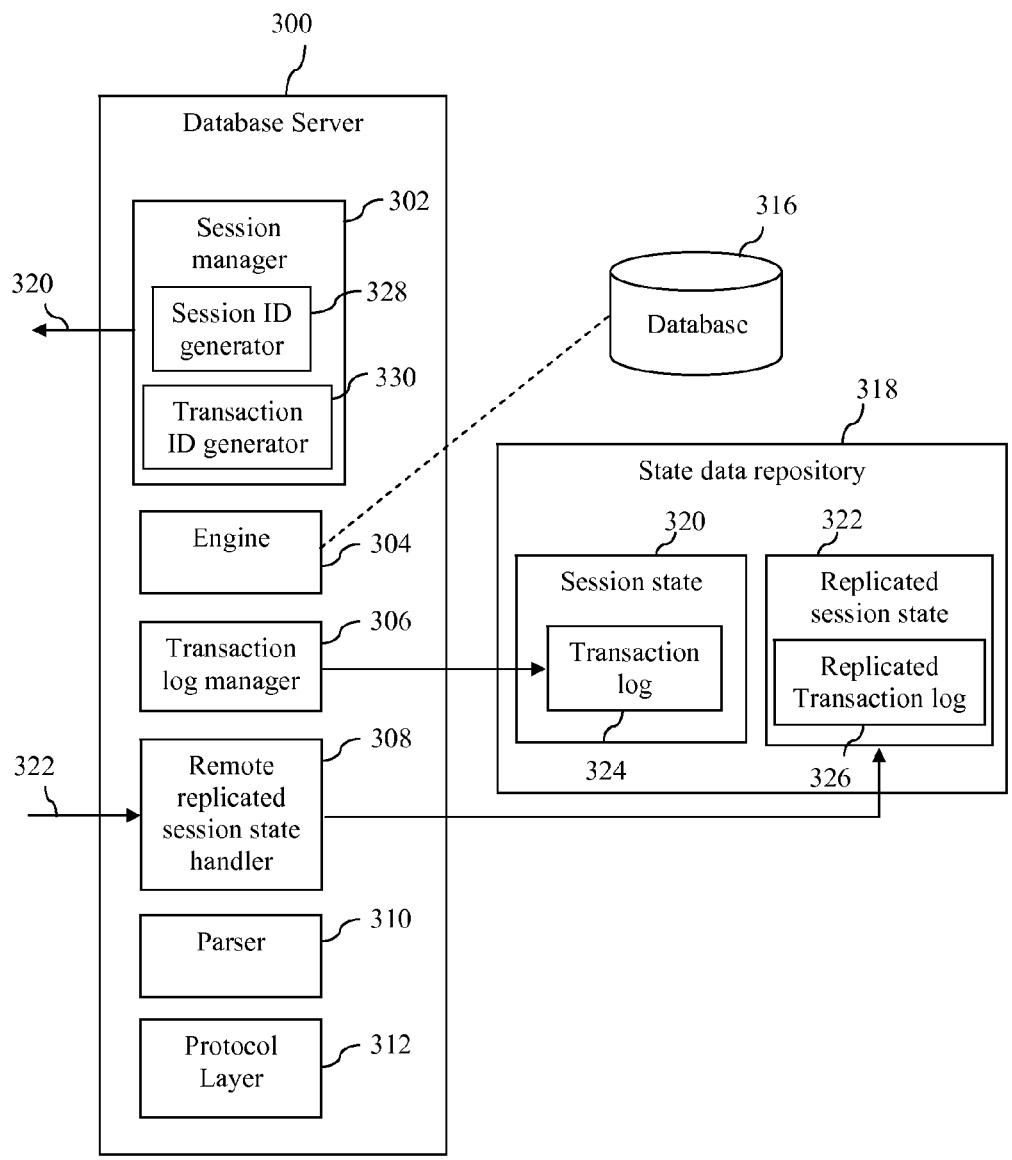
FIG. 3 is a block diagram of the database server shown in FIG. 1, according to an example embodiment.

FIG. 3 is a block diagram that illustrates various elements of a database server 300 in accordance with a further example embodiment. Database server 300 is an example of database servers 104a and 104b shown in FIG. 1. As shown in FIG. 3, in the further example embodiment, database server 300 comprises a session manager 302, an engine 304, a transaction log manager 306, a remote replicated session state handler 308, a parser 310 and a protocol layer 312. Session manager 302 includes a session ID generator 328 and a transaction ID generator 330.

Session manager 302 establishes a session with a client, such as client 200 of FIG. 2, to handle a database query for the client. For instance, session manager 302 may generator or may receive a session identifier from the client that is used to establish a session with the client, and is used by session manager 302 to identify communications associated with the established session. For instance, session ID generator 328 of session manager 302 is configured to generate an ID for each session that is established between client 200 and a database server to fulfill a data request (e.g., an SQL SELECT query, etc.) received from application 202. In one embodiment, session ID generator 328 generates a unique ID for each session. The session ID may be generated by session ID generator 328 at database server 300 as shown in FIG. 3, or may alternatively be generated at the client and transmitted to the database server, to establish the session, and may optionally be included in subsequent communications to and from the database server that occur within the scope of the established session (to identify those communications as being within the scope of the session).

Furthermore, session manager 302 may enable a transaction to be opened within the scope of an established session, and may receive commands associated with the transaction from the client. For instance, transaction ID generator 330 of session manager 302 is configured to generate an ID for each transaction that is opened by client 200 with a database server within the scope of a session. In one embodiment, transaction ID generator 330 generates a unique ID for each different transaction. Database server 300 may transmit the transaction ID to a client to open (e.g., begin) the transaction. Alternatively, the client may generate the transaction ID for the opened transaction, and may transmit the generated transaction ID to database server 300.

In the event of a session and transaction failure, session manager 302 may receive a session identifier from a client in a communication transmitted after the session failed, and may enable the failed session to be reestablished if the session identifier received in the communication matches the session identifier stored in the session state for a session. Furthermore, session manager 302 may receive a transaction identifier from the client corresponding to the failed transaction, and may enable the failed transaction to be continued if the transaction identifier received in the communication matches the transaction identifier stored in a transaction log for a session.

Engine 304 is configured to interact with one or more databases, such as a database 316 associated with database server 300, to perform various operations on data stored therein based on received commands, where such operations include but are not limited to storing, reading, analyzing, and/or modifying database data.

Transaction log manager 306 is intended to represent one implementation of transaction log managers 116a and 116b described above in reference to system 100 of FIG. 1 and thus performs the functions attributed to each of transaction log managers 116a and 116b. For instance, transaction log manager 306 may generate a transaction log 324 that stores the transaction identifier for an opened transaction, a command identifier associated with each received command of the transaction, and an indication of whether each received command has been successfully executed (either partially or fully). Transaction log 324 is an example of transaction log 108 described above. Transaction log 324 may be included in a session state 320 for the established session that is managed by session manager 302. For instance, session manager 302 may store the session identifier for the session in session state 320. Furthermore, temporarily stored data associated with the session, such as data retrieved by engine 304 from database 316 in response to one or more commands, may be stored in session state 320 (e.g., prior to being transmitted to the client). As shown in FIG. 3, session state 320 may be stored in a state data repository 318. State data repository 318 (and any further state data repositories described elsewhere herein) may include one or more of any type of storage mechanism, including a magnetic disc (e.g., a hard disk drive), an optical disc (e.g., an optical disk drive), a memory device such as a RAM device (e.g., a cache memory, for temporary storage), etc., and/or any other suitable type of storage medium.

Still further, after generating session state 320, session manager 302 may optionally replicate (e.g., copy) session state 320 to at least one additional database server (as indicated by the left-directed arrow labeled 320 in FIG. 3). The replicated session state enables the one or more additional database servers to reestablish a current session and continue any open transactions if the current session fails.

Remote replicated session state handler 308 is optionally present. Remote replicated session state handler 308 configured to receive replicated session states from other database servers. For instance, as shown in FIG. 3, remote replicated session state handler 308 receives a replicated session state 322 from a remote server (not shown in FIG. 3), and stores replicated session state 322 in state data repository 318. Replicated session state 322 enables database server 300 to respond to reestablish a failed session, and to continue an open transaction of the failed session, for a session that failed at a different database server. As shown in FIG. 3, replicated session state 322 includes a replicated transaction log 326. Replicated transaction log 326 is a copy of the transaction log from another database server, and may be used to continue a transaction open at the other database server at database server 300.

Parser 310 is configured to interpret client-generated commands that are received by database server 300 and to encode information to be sent to clients in accordance with a particular application layer protocol, such as but not limited to MS-TDS. In one embodiment, protocol layer 312 is intended to represent one or more computer programs executing in hardware (e.g., one or more processors) utilized by database server 300 to carry encoded information produced by parser 310 to the appropriate clients and to receive encoded commands therefrom.

Figure 4A:
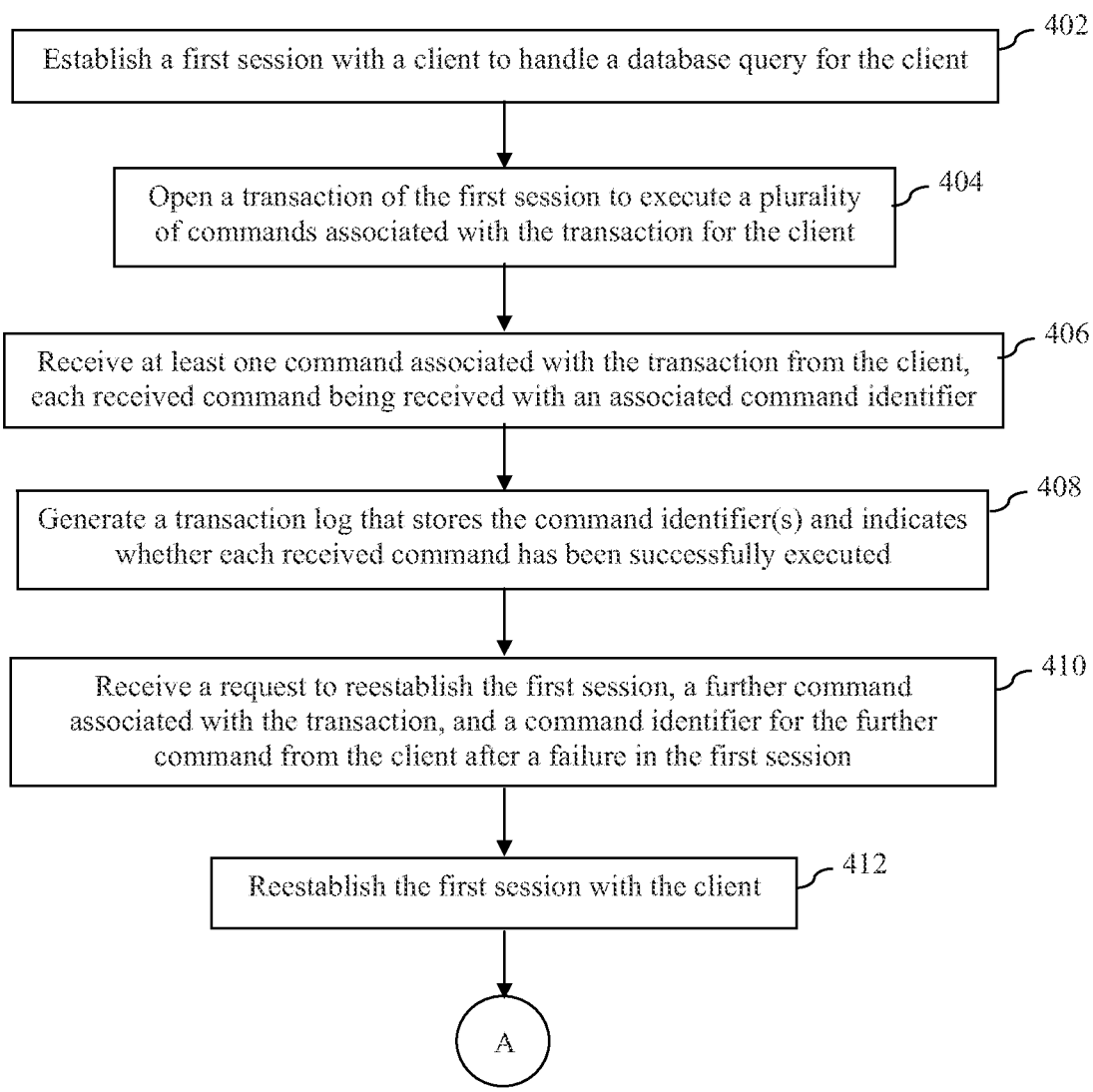
FIGS. 4A and 4B depict a flowchart of a process performed at a database server for performing a transaction in a session between the database server and a client, according to an example embodiment.
Figure 4B:
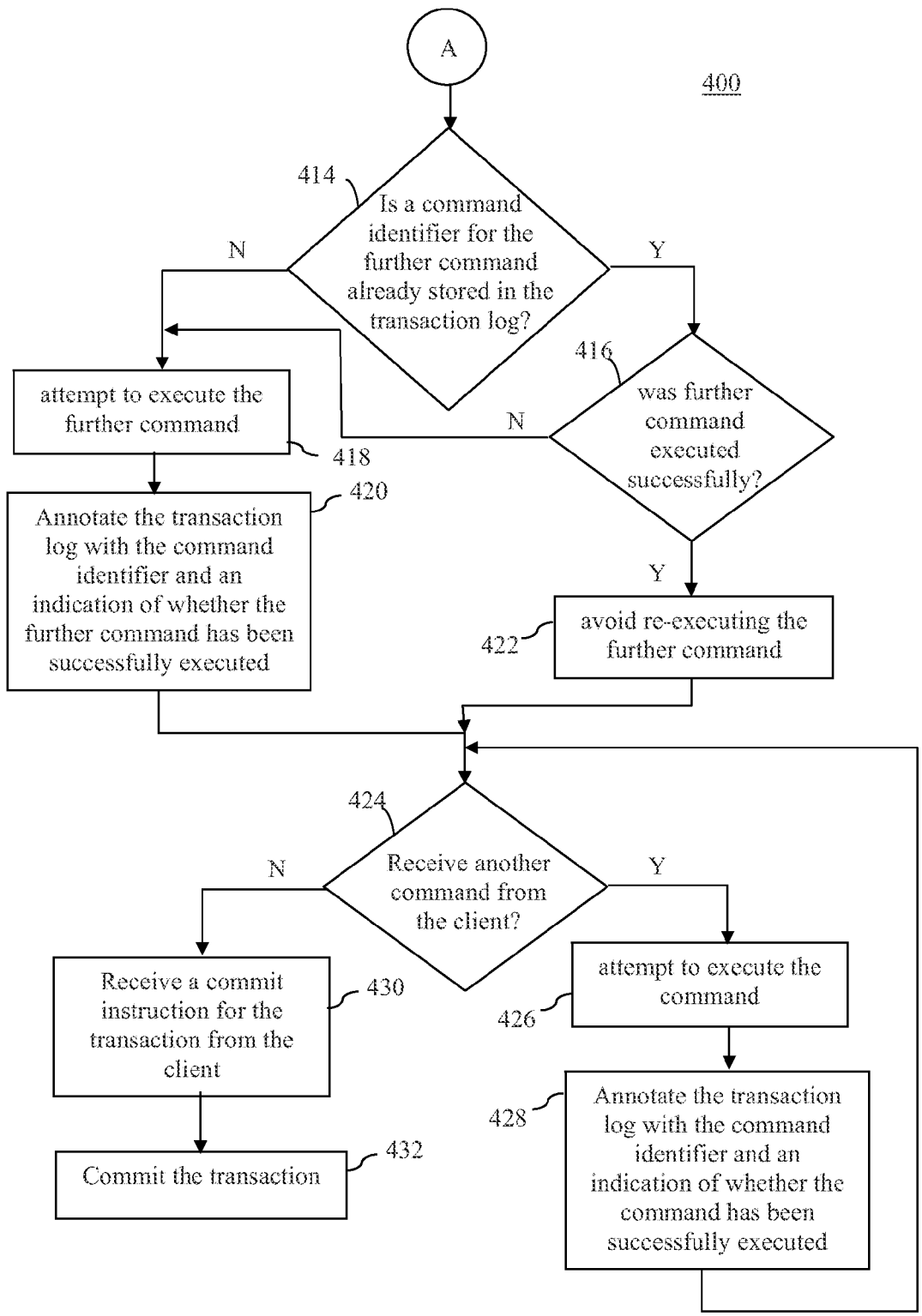
Figure 5:
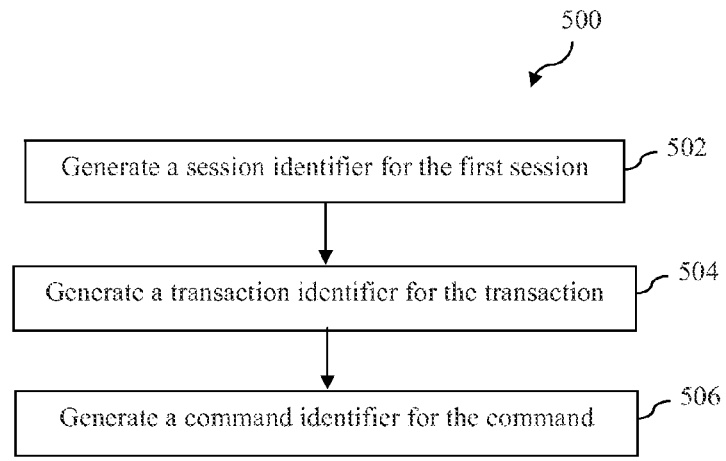
FIG. 5 depicts a flowchart of a process for generating session, transaction, and command identifiers, according to an example embodiment.

FIGS. 4A and 4B depict a flowchart 400 of a process performed at a database server for executing commands associated with a transaction between the database server and a client, according to an example embodiment. For the sake of illustration, flowchart 400 will now be described with continued reference to example embodiments described above in reference to FIGS. 1-3. However, the method of flowchart 400 is not limited to those embodiments.

As shown in FIG. 4A, the method of flowchart 400 begins at step 402. In step 402, a first session is established with a client to handle a database query for the client. For example, as described above, session ID generator 328 of database server (FIG. 3) may generate a session identifier used to identify a particular session. In an embodiment, session ID generator 328 may perform a step 502 of a flowchart 500 shown in FIG. 5. In step 502, a session identifier is generated for the first session. Session ID generator 328 may generate the session identifier in any manner, including incrementing the numerical value of a prior generated session identifier, generating the session identifier in a random or pseudorandom manner, or generating the session identifier in another manner.

Referring to FIG. 1, database server 104a may transmit the session identifier to a client to initiate a session with the database server. For instance, database server 104a may transmit the session identifier to client 102 in a communication transmitted over communication channel 106a, may store the session identifier (e.g., in session state 320), and may establish a session with client 102. For instance, referring to FIG. 3, session manager 302 may establish the session with the client, and may receive an acknowledgment from the client. In establishing the session, the client and database server may negotiate various parameters of the session, including authentication and encryption techniques/protocols, etc. Operation proceeds from step 402 to step 404.

Note that in an alternative embodiment, client 102 may generate the session identifier, and may transmit the generated session identifier to database server 104a to establish the session.

Referring back to FIG. 4A, in step 404, a transaction of the first session is opened to execute a plurality of commands associated with the transaction for the client. For example, as described above, database server 104a may open a transaction with client 102 to perform a series of database commands. The transaction may be an atomic transaction, such that all of the database commands of the transaction are performed, or none of them are performed (if there is a failure). Transaction ID generator 330 of database server 300 (FIG. 3) may generate the transaction identifier used to identify a particular transaction. For instance, in an embodiment, transaction ID generator 330 may perform a step 504 of a flowchart 500 shown in FIG. 5. In step 502, a transaction identifier is generated for the transaction. Transaction ID generator 330 may generate the transaction identifier in any manner, including incrementing the numerical value of a prior generated transaction identifier, generating the transaction identifier in a random or pseudorandom manner, or generating the transaction identifier in another manner.

Referring to FIG. 1, database server 104a may transmit the session identifier to a client to initiate a session with the client (e.g., in response to a request received from the client). For instance, database server 104a may transmit the transaction identifier to a client to initiate or open a transaction with the database server. Client 102 may receive the transaction identifier from database server 104a in a communication transmitted over communication channel 106a, may store the received transaction identifier, and may open the transaction with client 102. For instance, referring to FIG. 3, transaction log manager 306 may store the transaction identifier in transaction log 324 generated for the transaction. Client 102 and/or database server 104a may transmit an acknowledgment that the transaction is open. Operation proceeds from step 404 to step 406.

Referring back to FIG. 4A, in step 406, at least one command associated with the transaction is received from the client, each received command being received with an associated command identifier. In embodiments, any number of commands may be transmitted from client 102 to database server 104a within the scope of the opened transaction, including commands to read, write, or update database data. Database server 104a may respond to each of the commands. Database server 104a may receive a command ID associated with each of the one or more received commands. As discussed above, such command IDs may be generated by command ID generator 218 within client 200 (FIG. 2) and transmitted to database server 104a along with their associated commands. For instance, in an embodiment, command ID generator 218 may perform a step 506 of flowchart 500 shown in FIG. 5 for each command. In step 504, a command identifier is generated for the command. Command ID generator 218 may generate the command identifier in any manner, including incrementing the numerical value of a prior generated command identifier (e.g., generating command identifiers in sequence), generating the command identifier in a random or pseudorandom manner, or generating the command identifier in another manner.

With reference to the implementation of client 200 shown in FIG. 2, such commands may be encoded by parser 220 and sent to database server 104a via protocol layer 222. With reference to the implementation of database server 300 shown in FIG. 3, the encoded commands may be received via protocol layer 312 and interpreted by parser 310. Operation proceeds from step 406 to step 408.

Referring back to FIG. 4A, in step 408, a transaction log is generated that stores the command identifier(s) and indicates whether each received command has been successfully executed. In embodiments, database server 104a attempts to execute each command received by database server 104a in step 406. With reference to the implementation of database server 300 shown in FIG. 3, engine 304 may execute the commands, including retrieving requested data, writing data, and modifying data in database 316. Read data may optionally be stored in session state 320 while waiting to be transmitted to client 102. In the case of an atomic transaction, writing and modifying of data in database 316 may not be fully executed until a commit instruction is received from client 102. Transaction log manager 306 is configured to store the command identifier associated with each received command of the transaction in transaction log 324. Furthermore, transaction log manager 306 stores an indication of whether each received command has been successfully executed (e.g., partially or fully) in transaction log 324. Operation proceeds from step 408 to step 410.

In step 410, a request to reestablish the first session, a further command associated with the transaction, and a command identifier for the further command are received from the client after a failure in the first session. As described above, a session between a client and a database server may undergo a session failure. The session failure may occur for a variety of reasons, including a network failure between the client and database server, or a failure in the database server (e.g., a server crash, etc.). Subsequent to such a failure, in an embodiment, the session between the client and the database server may be recovered, and any transactions that were open at the time of the session failure may be continued in an efficient manner.

Referring to FIG. 1, after the session failure, client 102 may attempt to re-establish the failed session with database server 104a. In such case, client 102 may re-transmit the session identifier used for the failed session to database server 104a in a request to re-establish the session. Furthermore, client 102 may transmit a further command to database server 104a with the command identifier for the further command. The request to reestablish the session and the retransmission of the command may be received by database server 104a from client 102 in a same communication or in separate communications. Operation proceeds from step 410 to step 412.

Figure 6:
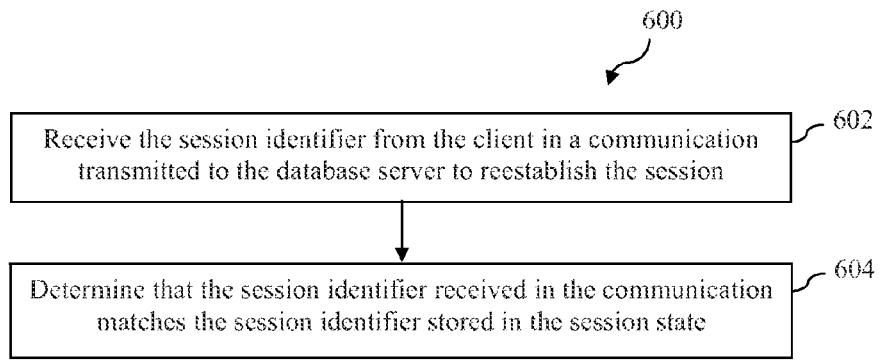
FIG. 6 depicts a flowchart of a process performed at a database server to identify a previously defined session, according to an example embodiment.

Referring back to FIG. 4A, in step 412, the first session is reestablished with the client. Database server 104a may analyze the received request to re-establish the session to determine whether to reestablish the session with client 102. For instance, in an embodiment, database server 104a may perform a process shown in FIG. 6. FIG. 6 depicts a flowchart 600 of a process performed at a database server to identify a previously defined session, according to an example embodiment.

As shown in FIG. 6, flowchart 600 begins with a step 602. In step 602, the session identifier is received from the client in a communication transmitted to the database server to reestablish the session. As described above, database server 104a may receive the session identifier used for the failed session from client 102 in a request to re-establish the session.

In step 604, it is determined that the session identifier received in the communication matches the session identifier stored in the session state. In an embodiment, database server 104a may compare the session identifier received in step 602 to session identifiers stored in one or more session states to determine whether the received session identifier is for a pre-existing session.

Figure 7:
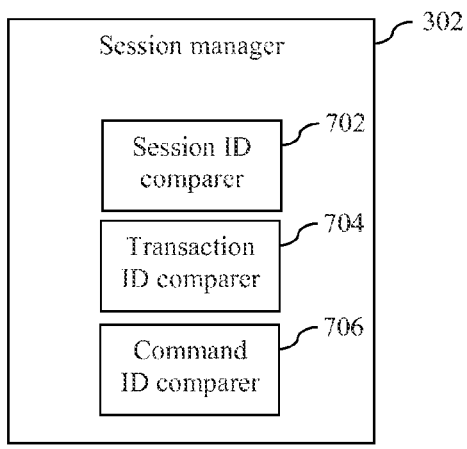
FIG. 7 is a block diagram of a session manager of a database server configured to identify transactions and commands associated with a previously defined session, according to an example embodiment.

For instance, in an embodiment, session manager 302 of FIG. 3 may perform the comparison. FIG. 7 is a block diagram of session manager 302 of FIG. 3, according to an example embodiment. As shown in FIG. 7, session manager 302 may include a session ID comparer 702, a transaction ID comparer 704, and a command ID comparer 706. Session ID comparer 702 is configured to compare session identifiers received in communications from clients to session identifiers stored in session states. Session ID comparer 702 may perform step 604 by comparing the session identifier received in the request to reestablish the session to the session identifier in transaction log 108 (FIG. 1). If the session identifiers match, session ID comparer 702 indicates a match, and session manager 302 may enable the session to be reestablished. If the received session identifier does not match a session identifier in a stored session state, session ID comparer 702 indicates a match is not found. In such case, session manager 302 may not enable the session to be reestablished. (Instead, the session may potentially be reestablished with a different database server, if a match occurs at that different database server). Operation proceeds from step 412 in FIG. 4A to step 414 in FIG. 4B.

Referring to FIG. 4B, in step 414, whether a command identifier is already stored in the transaction log for the further command is determined. In an embodiment, the further command received from client 102 may be a re-transmission of a previously transmitted command by client 102 that may or may not have been received and/or successfully executed by database server 104a due to the session failure. For instance, due to the session failure, client 102 may not have received an acknowledgement from database server 104a regarding the command, and thus may not even be aware of whether the command was received by database server 104a.

Database server 104a may analyze the received retransmitted command to determine how to proceed. Database server 104a may determine whether the command identifier for the received command is indicated in transaction log 108. For instance, in an embodiment, referring to FIG. 7, transaction ID comparer 704 of session manager 302 may compare the transaction identifier for the received command to the transaction identifier stored in transaction log 108 to determine whether command is part of the open transaction. If the transaction identifier is not stored in transaction log 108, database server 104a may treat the command as part of a different transaction. If the transaction identifier is stored in transaction log 108, the further command is considered to be part of the open transaction. Command ID comparer 706 of session manager 302 may then compare the command identifier for the received further command to any command identifiers stored in transaction log 108. Operation proceeds to step 416 if a match is found. If the received command identifier does not match any command identifier in transaction log 108, operation proceeds to step 418.

In step 416, whether the further command was executed successfully is determined. Because the command identifier for the further command is located in transaction log, the command was previously received at database server 104a from client 102. According to step 416, session manager 302 (FIG. 3) may access transaction log 324 for an indication whether the further command was executed successfully. If the indication is that the further command was not executed successfully, operation proceeds to step 418. If the indication is that the further command was executed successfully, operation proceeds to step 422.

In step 418, the further command is attempted to be executed. Because the further command was indicated as not executed successfully (which may mean the further command was not executed at all), the further command is attempted to be executed. For instance, engine 304 (FIG. 3) may execute the further command (e.g., reading, writing, and/or updating data). If the open transaction is an atomic transaction, the further command may be partially executed, as described above. Operation proceeds from step 418 to step 420.

In step 420, the transaction log is annotated with the command identifier and an indication of whether the further command has been successfully executed. In an embodiment, after executing a command, transaction log manager 306 (FIG. 3) may annotate transaction log 324 with the command identifier for the executed command (if not already present in transaction log 324) and may indicate in transaction log 324 whether the command was successfully executed (e.g., partially or fully). Operation proceeds from step 420 to step 424.

In step 422, the further command is avoided being re-executed. Because the further command was indicated as executed successfully, the further command does not need to be executed again. For instance, the further command may have been previously executed when the further command was previously received by database server 104a from client 102. Operation proceeds from step 422 to step 424.

In step 424, it is determined whether another command is received from the client. In embodiments, the further command received in step 410 may be the last command of the open transaction, or additional commands may be received for the open transaction. If another command for the open transaction is received from client 102 (e.g., as indicated by the transaction identifier received with the command, and/or by the command being received while the transaction is still open, etc.), operation proceeds to step 426. If another command is not received, operation proceeds to step 430.

In step 426, the command is attempted to be executed. In a similar manner as in step 418, engine 304 (FIG. 3) may execute the command (e.g., reading, writing, and/or updating data). If the open transaction is an atomic transaction, the command may be partially executed, as described above. Operation proceeds from step 426 to step 428.

In step 428, the transaction log is annotated with the command identifier and an indication of whether the command has been successfully executed. Similarly to step 420, after executing a command, transaction log manager 306 (FIG. 3) may annotate transaction log 324 with the command identifier for the executed command (if not already present in transaction log 324) and may indicate in transaction log 324 whether the command was successfully executed. Operation proceeds from step 428 to step 424.

In step 430, a commit instruction for the transaction is received from the client. After client 102 has transmitted all commands of an open transaction to database server 104a (and has received corresponding acknowledgments), client 102 may transmit a commit instruction to database server 104b to have the transaction committed. Operation proceeds from step 430 to step 432.

In step 432, the transaction is committed. Database server 104a (e.g., session manager 302) causes all commands of the transaction to be fully executed (e.g., writes and/or updates are made to data in database 316, etc.). Any data to be transmitted to client 102 (e.g., due to database reads, etc.) may be transmitted to client 102. A commit acknowledgment may be transmitted by database server 104a to client 102. Furthermore, transaction log manager 306 may indicate the transaction as complete in transaction log 324, or may delete transaction log 324. Operation of flowchart 400 is complete.

Thus, by generating and storing transaction log 108, transaction log manager 306 (FIG. 3) enables client 102 and database server 104a to recover and continue an open transaction from a session failure. After detecting the failure, such as by receiving an indication of a connection or communication failure/error, client 102 can retransmit the current command (with command identifier), the transaction identifier, and the session identifier of the failed session. Database server 104a may receive the command, transaction identifier, and session identifier, and the session may be reestablished between client 102 and database server 104a. Furthermore, the open transaction may be continued, and the command may be executed if not previously executed.

Figure 8:
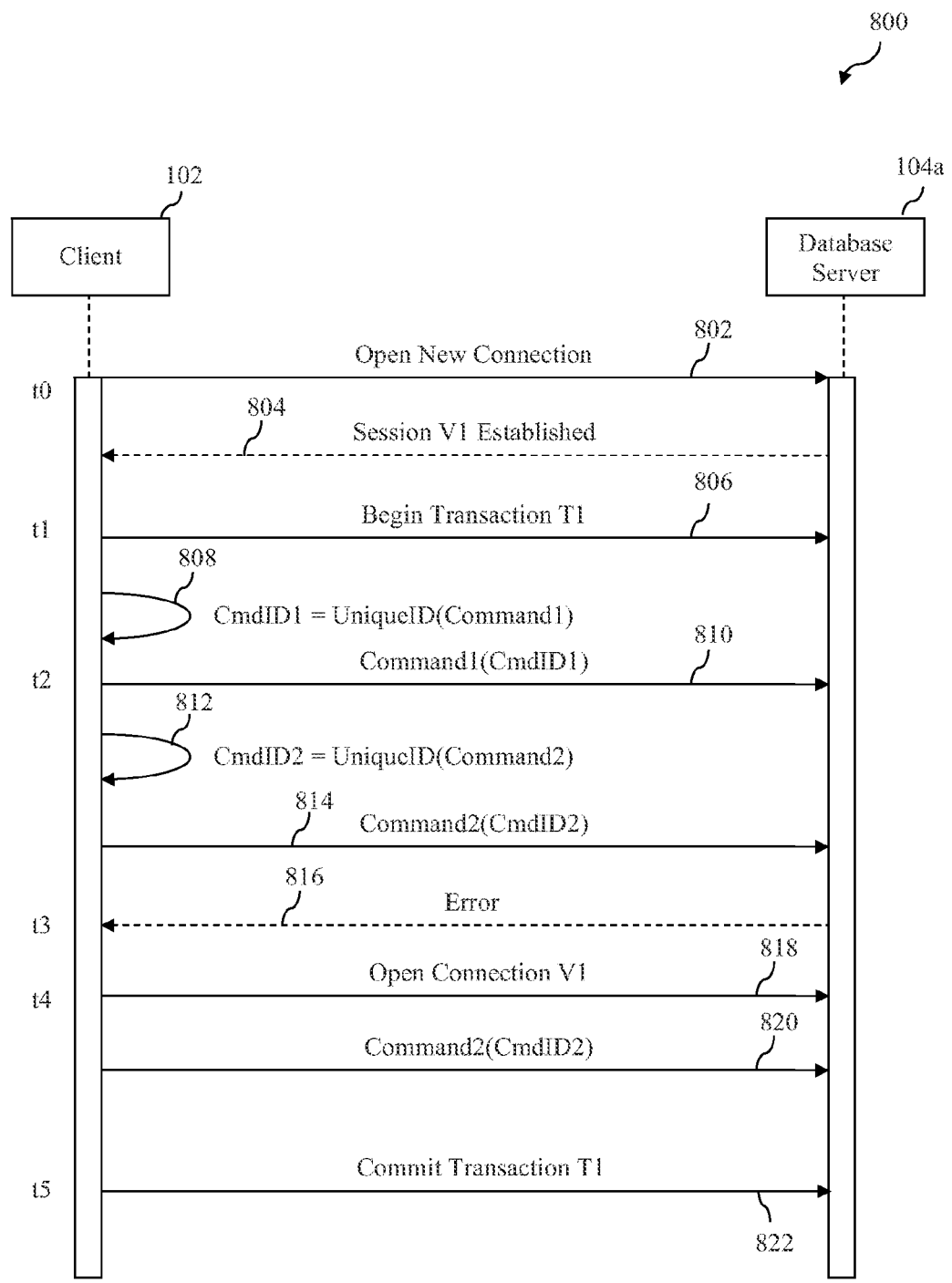
FIG. 8 is a sequence diagram that illustrates a flow of information between a client and a database server in a system that enables transaction completion in the event of session failures, according to an example embodiment.

FIG. 8 is a sequence diagram 800 that illustrates an example flow of information between client 102 and database server 104a in accordance with an embodiment. Sequence diagram 800 is described herein merely to facilitate a further understanding of the manner in which system 100 may facilitate recovery from session failures and is not intended to be limiting.

As shown in FIG. 8, the flow of information depicted by sequence diagram 800 begins when client 102 sends a request 802 to database server 104a to open a new connection. In response to receiving request 802, database server 104a sends a session established response 804 to client 102, which may include a session identifier for a new session to be established, thereby establishing the requested connection.

Subsequent to the establishment of the connection, client 102 transmits a begin transaction request 806 to open a transaction (referred to as Transaction T1) to database server 104a. Database server 104a may transmit a response (not shown in FIG. 8) to client 102 that includes a transaction identifier for the new transaction to be established, thereby indicating that the transaction is open.

After client 102 has opened the transaction with database server 104a, client 102 generates a command, referred to as "Command1," for transmission to database server 104a. Client 102 then applies a method referred to as "UniqueID" to Command1 to obtain a unique ID associated therewith, referred to as "CmdID1." This is shown as event 808 in FIG. 8.

After client 102 has obtained the unique identifier CmdID1 associated with Command1, client 102 sends both Command1 and its associated unique ID CmdID1 to database server 104a as part of a message 810. The session identifier and transaction identifier may optionally be sent with Command1 to identify Command1 as being within the scope of the established session and open transaction, respectively.

Database server 104a receives Command1 and may execute it at least partially, as described above. Database server 104a (e.g., transaction log manager 306 of FIG. 3) may store the command identifier and an indication of whether the command was successfully executed in transaction log 108. Database server 104a may transmit an acknowledgment (not shown in FIG. 8) to client 102 indicating that Command1 was received.

Subsequent to transmitting Command1, client 102 generates another command, referred to as "Command2," for transmission to database server 104a. Client 102 then applies the UniqueID method to Command2 to obtain a unique ID associated therewith, referred to as "CmdID2." This is shown as event 812 in FIG. 8.

After client 102 has obtained the unique identifier CmdID2 associated with Command2, client 102 sends both Command2 and its associated unique ID CmdID2 to database server 104*a* as part of a message 814. The session identifier and transaction identifier may optionally be sent with Command2 to identify Command2 as being within the scope of the established session and open transaction, respectively.

After message 814 is sent, client 102 receives an indication 816 that an error has occurred. Such error may result from some failure of communication between client 102 and database server 104*a* or from a breaking of the session that was established between client 102 and database server 104*a*.

Because such error has occurred, client 102 cannot determine whether Command2 was received by database server 104*a* (e.g., because an acknowledgement was nor received) and whether the transaction has failed. If the transaction fails and is an atomic transaction, the transaction would have to be retried from its beginning.

Consequently, client 102 may re-establish a new session with database server 104*a* that is part of a same virtual session as the previously-broken session. For instance, client 102 may re-transmit the session identifier for the failed session to database server 104*a* in a message 818 to reestablish the session. Furthermore, client 102 re-transmits Command2 along with its unique ID CmdID2 and the transaction identifier to database server 104*a* as part of a message 820.

Note that if database server 104*a* is functioning after the session failure, and if a communication is not received from client 102 requesting to reestablish the first session after a predetermined amount of time expires after the session failure, database server 104*a* may delete transaction log 108. For instance, database server 104*a* may assume that the transaction is not going to be continued, and may delete transaction log 108 to save storage (e.g., cache memory) space.

When database server 104*a* receives Command2, its unique ID CmdID2, and the transaction identifier, it checks to determine if CmdID2 has already been stored in transaction log 108 (associated with the transaction identifier). This may entail checking all command IDs associated with the transaction. If CmdID2 has already been stored in transaction log 108, database server 104*a* may send an acknowledgement (not shown in FIG. 8) to client 102 indicating that Command2 was received. If CmdID2 was not found in transaction log 108, database server 104*a* may at least partially execute Command2, and may transmit the acknowledgement (not shown in FIG. 8) to client 102 indicating that Command2 was received.

When all commands of the transaction have been transmitted from client 102 to database server 104*a* (and acknowledged as received), client 102 transmits a commit instruction 822 to cause the opened transaction, Transaction T1, to be committed at database server 104*a*. Commit instruction 822 may include the transaction identifier to identify to database server 104*a* the transaction to be committed. In response, database server 104*a* commits the transaction, as described above. When complete, database server 104*a* may transmit a response (not shown in FIG. 8) to client 102 indicating that the transaction is committed.

As shown by the foregoing, system 100 advantageously operates to ensure that database server 104*a* can recover from a session failure, and does not execute a command more than once, even if client 102 sends the same command multiple times. Such an ability to not perform a command more than once, no matter how many times received, is referred to as "idempotent command execution." This enables handling of database commands at client 102 at the database driver level, thereby unburdening the application programmer from having to include retry features in the application and thus simplifying the application logic.

III. Example Embodiments for Recovery from Session Failures between a Client and a Database Server using a Different Database Server As described above, a database query session between a client and a database server may undergo a session failure (e.g., before step 410 of flowchart 400 in FIG. 4A). The session failure may occur for a variety of reasons, including a network failure between the client and database server, or a failure in the database server. Subsequent to such a failure, in an embodiment, rather than recovering the session and any open transactions between the client and the same database server, the session and open transactions may be recovered with a different database server. For instance, the original database server may not be available to participate in a new session (may not be functioning properly, etc.). As such, a different database server may be used to recover the session and transactions with the client. Any transactions that were open at the time of the session failure may be continued by the different database server in an efficient manner.

For instance, referring to FIG. 1, transaction log 108 may be replicated (copied) to another database server, such as database server 104*b*, to enable recovery from a session failure that may occur between client 102 and database server 104*b*. As shown in FIG. 1, transaction log 108 may be replicated to database server 104*b* as replicated transaction log 110. In an embodiment, database server 104*a* may perform a step 902 shown in FIG. 9 to replicate a transaction log. In step 902, the session state is replicated to at least one additional database server 902. Referring to the example of FIG. 3, session manager 302 may transmit session state 320 to one or more additional database servers that have access to database 316 (or a copy thereof). By replicating session state 320, transaction log 324 is also replicated to the additional database server(s).

As such, after detecting a failure, such as by receiving an indication of a network connection or communication failure/error, client 102 can retransmit the session identifier of the failed session. Database server 104*b* may receive the session identifier, such as through a network gateway device that routes communications to database server 104*b* rather than database server 104*a* (e.g., because database server 104*a* is not operating, etc.). In another embodiment, client 102 may include a list of database servers, and may try a different database server in the list when the session with a current database server fails (e.g., after one or more retries, etc.). Database server 104*b* may establish a session with client 102 based on the same session identifier. Subsequently, commands of the transaction that are transmitted by client 102 may be handled at database server 104*b*, with replicated transaction log 110 being used to manage the transaction.

FIG. 10 depicts a flowchart 1000 of a process performed at a second database server to recover from a session failure between a first database server and a client, according to an example embodiment. For the sake of illustration, flowchart 1000 will now be described with continued reference to example embodiments described above in reference to FIGS. 1-3. However, the method of flowchart 1000 is not limited to those embodiments.

As shown in FIG. 10, the method of flowchart 1000 begins at step 1002. In step 1002, a replicated session state is received from a first database server at a second database server. For example, as shown in FIG. 3, remote replicated session state handler 308 may receive replicated session state 322 from a first database server. As shown in FIG. 3, replicated session state 322 includes a replicated transaction log 326. In the example of FIG. 1, second database server 104b may receive replicated transaction log 110 in a replicated session state received from first database server 104a. As described above, replicated transaction log 110 is a copy of transaction log 108, which stores information regarding an open transaction between client 102 and database server 104a.

In step 1004, a request is received at the second database server from a client to establish a session with the client. After detecting a failure in the session between client 102 and database server 104a, client 102 may attempt to reestablish the session by transmitting a request. Database server 104b may receive the request from client 102 indirectly, such as through a network gateway device that selects active database servers to respond to database requests for a particular domain or cluster of servers. Alternatively, database server 104b may receive the request directly from client 102. For instance, client 102 may include a list of associated database servers (e.g., that handle requests for one or more common databases) with addresses for each of the database servers (e.g., IP addresses, etc.). Client 102 may first attempt to reestablish the session with database server 104a, and if database server 104a is non-responsive, may try to reestablish the session with a different database server in the list by communicating with that database server directly. In the current example, the request to reestablish the session is received by database server 104b as an alternative database server.

In step 1006, a session identifier included in the request is determined to match the session identifier included in the replicated session state. For instance, as described above, session ID comparer 702 of session manager 302 (FIG. 3) may compare the session identifier received in the request to the session identifier in the replicated session state.

In step 1008, a second session is established with the client at the second database server. If the session identifiers match in step 1006, session ID comparer 702 indicates a match, and session manager 302 may enable the session to be reestablished and may store an indication as such. If the received session identifier does not match a session identifier in a stored session state, session ID comparer 702 indicates a match is not found. In such case, session manager 302 may not enable the session to be reestablished.

In step 1010, a further command associated with the second session is received from the client at the second database server. Client 102 may transmit a command to database server 104b that was previously transmitted to database server 104a that may not have been received and/or executed due to the session failure. The transmitted command (e.g., command identifier and transaction identifier) may be transmitted over communication channel 106b and received by database server 104b.

At this point, operation may proceed at second database server 104b (using replicated transaction log 110) in a similar fashion as described above for first database server 104a with respect to flowchart 400 shown in FIG. 4B (proceeding from step 1010 of FIG. 10 to step 414 of FIG. 4B to perform steps 414-432). In other words, it may be determined whether the further command received in step 1010 has an identifier already stored in replicated transaction log 110 (step 414). If so, whether the further command was executed may be determined (step 416), and may either be executed (step 418) and annotated to replicated transaction log 110 (step 420) or may not be executed (step 422). If the command identifier was not already stored in replicated transaction log 110, the further command may be executed (step 418) and annotated to replicated transaction log 110 (step 420). Further commands received at second database server 104b may be processed (steps 424-428), and the transaction may be committed at second database server 104b (steps 430-432). In this manner, second database server 104b continues and commits the transaction that was opened at database server 104a without having to execute any commands multiple times.

In this manner, replication of a transaction log is used to continue a transaction at a different database server than originally established the session with the client. In the embodiment of FIG. 3, each database server may include a corresponding repository (e.g., state data repository 318) to store a copy of the session state—either the original copy (session state 320, containing transaction log 324) at the first database server (e.g., database server 104a of FIG. 1) or replicated copies (replicated session state 322, containing replicated transaction log 326) at the additional database servers (e.g., database server 104b of FIG. 1). It is noted, other approaches may be used to achieve this goal.

Figure 11:
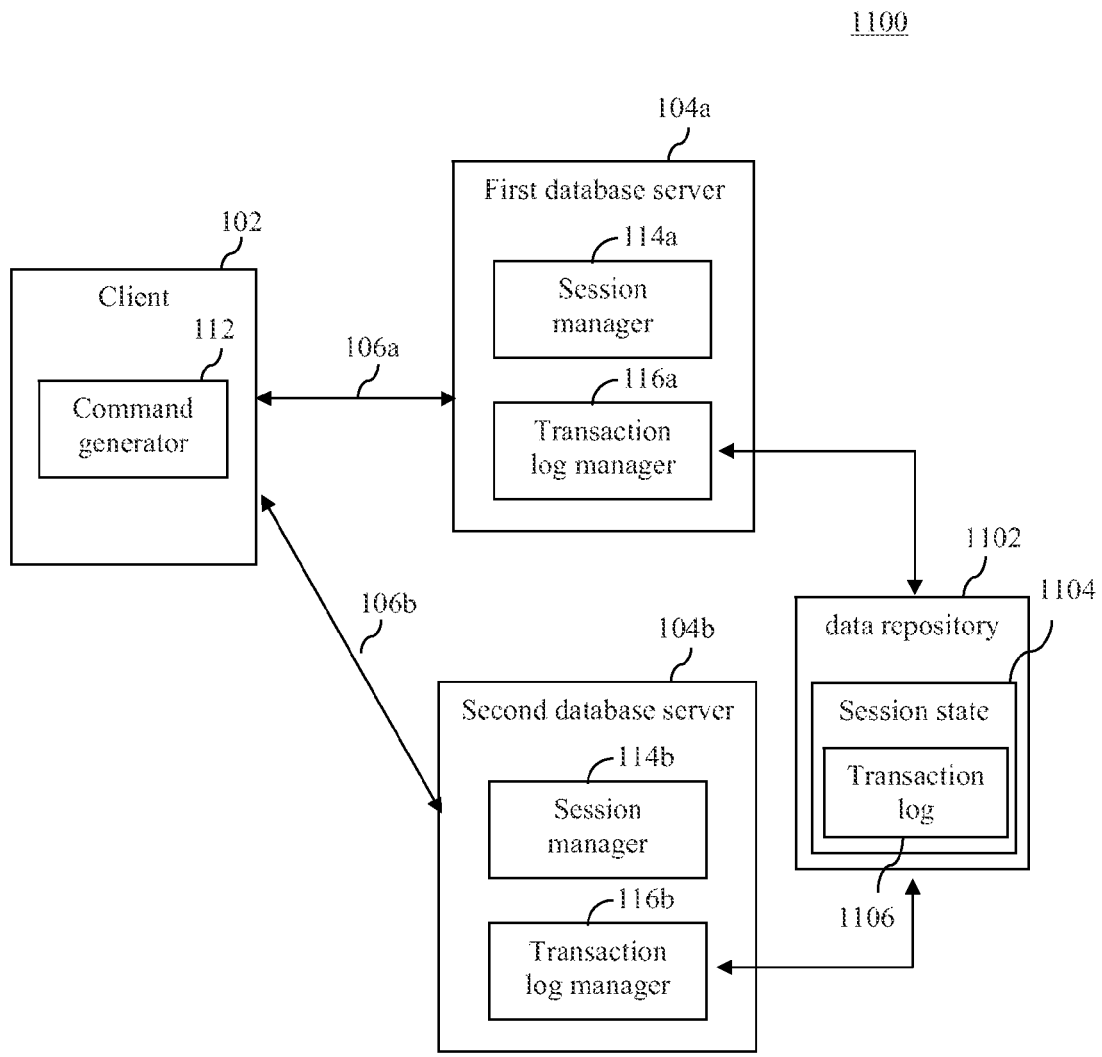
FIG. 11 is a block diagram of an example system that facilitates recovery from session failures in which state-related information is shared between a first database server and a second database server via use of a shared memory, according to an example embodiment.

For example, FIG. 11 is a block diagram of an example system 1100 that utilizes a shared memory approach to achieve the goal. System 1100 includes client 102, first database server 104a, second database server 104b, first session manager 114a, second session manager 114b, first transaction log manager 116a, and second transaction log manager 116b, and operates in a substantially similar manner to system 100 of FIG. 1. However, in system 1100, rather than using replication to ensure that second transaction log manager 116b has access to a separate copy of a transaction log generated by first transaction log manager 116a, a shared state data repository 1102 is used. In accordance with this approach, first transaction log manager 116a and second transaction log manager 116b are both able to access the same transaction log 1106 stored in shared state data repository 1102 in a common session state 1104 used for the session. Consequently, session state and transaction information stored in shared data repository 1102 by first database server 104a will subsequently be accessible to second database server 104b (e.g., to recover and/or continue a failed session between database server 104a and client 102). Likewise, session state and transaction information stored in shared data repository 1102 by second database server 104b will subsequently be accessible to first database server 104a.

Figure 12:
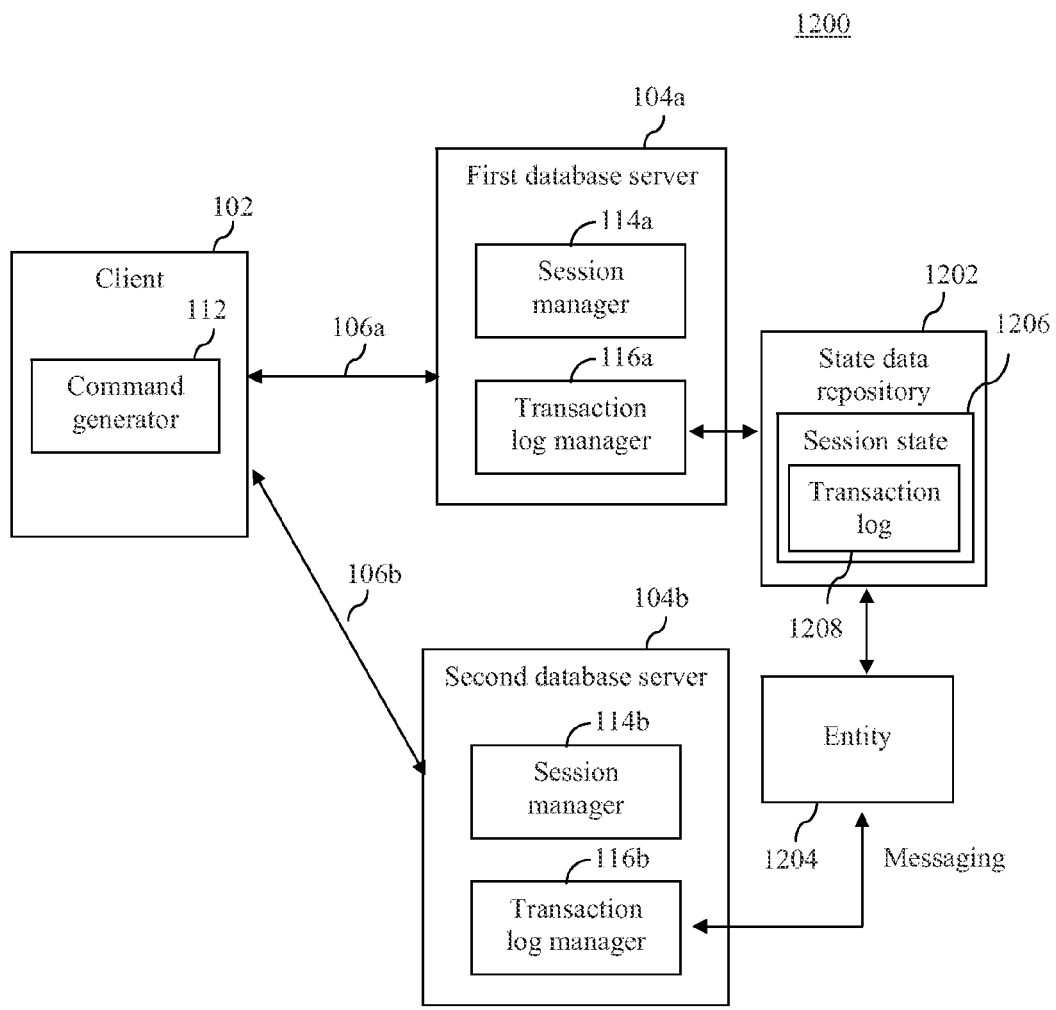
FIG. 12 is a block diagram of an example system that facilitates recovery from session failures in which state-related information is shared between a first database server and a second database server via messaging, according to an example embodiment.

FIG. 12 is a block diagram of an example system 1200 that utilizes a messaging approach to achieve the same goal. System 1200 includes client 102, first database server 104a, second database server 104b, first session manager 114a, second session manager 114b, first transaction log manager 116a, and second transaction log manager 116b, and operates in a substantially similar manner to system 100 of FIG. 1. However, in system 1200, rather than using replication or a shared repository, a messaging approach is used. In accordance with this approach, first session manager 114a is configured to store session state 1206 (e.g., session IDs, command IDs, retrieved data, and/or further data) in a state data repository 1202, and first transaction log manager 116a stores a transaction log 1208 in session state 1206. When second transaction log manager 116b determines that it will require access to transaction log 1208 (e.g., to recover and/or continue a transaction that was open between database server 104a and client 102), second transaction log manager 116b may transmit a message to an entity 1204 having access to state data repository 1202, and entity 1204 sends the corresponding data to second transaction log manager 116b.

IV. Example Processor-Based System Implementation

Client 102, database server 104a, database server 104b, command generator 112, session manager 114a, session manager 114b, transaction log manager 116a, transaction log manager 116b, client 200, application 202, database driver 204, API 212, session ID generator 328, transaction ID generator 330, command ID generator 218, parser 220, protocol layer 222, database server 300, session manager 302, engine 304, transaction log manager 306, remote replicated session state handler 308, parser 310, protocol layer 312, session ID comparer 702, transaction ID comparer 704, command ID comparer 706, entity 1204, flowchart 400, flowchart 500, flowchart 600, step 902, and flowchart 1000 may be implemented in hardware, or hardware and any combination of software and/or firmware. For example, client 102, database server 104a, database server 104b, command generator 112, session manager 114a, session manager 114b, transaction log manager 116a, transaction log manager 116b, client 200, application 202, database driver 204, API 212, session ID generator 328, transaction ID generator 330, command ID generator 218, parser 220, protocol layer 222, database server 300, session manager 302, engine 304, transaction log manager 306, remote replicated session state handler 308, parser 310, protocol layer 312, session ID comparer 702, transaction ID comparer 704, command ID comparer 706, entity 1204, flowchart 400, flowchart 500, flowchart 600, step 902, and/or flowchart 1000 may be implemented as computer program code configured to be executed in one or more processors and stored in a computer readable storage medium. Alternatively, client 102, database server 104a, database server 104b, command generator 112, session manager 114a, session manager 114b, transaction log manager 116a, transaction log manager 116b, client 200, application 202, database driver 204, API 212, session ID generator 328, transaction ID generator 330, command ID generator 218, parser 220, protocol layer 222, database server 300, session manager 302, engine 304, transaction log manager 306, remote replicated session state handler 308, parser 310, protocol layer 312, session ID comparer 702, transaction ID comparer 704, command ID comparer 706, entity 1204, flowchart 400, flowchart 500, flowchart 600, step 902, and/or flowchart 1000 may be implemented as hardware logic/electrical circuitry.

For instance, in an embodiment, one or more of client 102, database server 104a, database server 104b, command generator 112, session manager 114a, session manager 114b, transaction log manager 116a, transaction log manager 116b, client 200, application 202, database driver 204, API 212, session ID generator 328, transaction ID generator 330, command ID generator 218, parser 220, protocol layer 222, database server 300, session manager 302, engine 304, transaction log manager 306, remote replicated session state handler 308, parser 310, protocol layer 312, session ID comparer 702, transaction ID comparer 704, command ID comparer 706, entity 1204, flowchart 400, flowchart 500, flowchart 600, step 902, and/or flowchart 1000 may be implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 13:
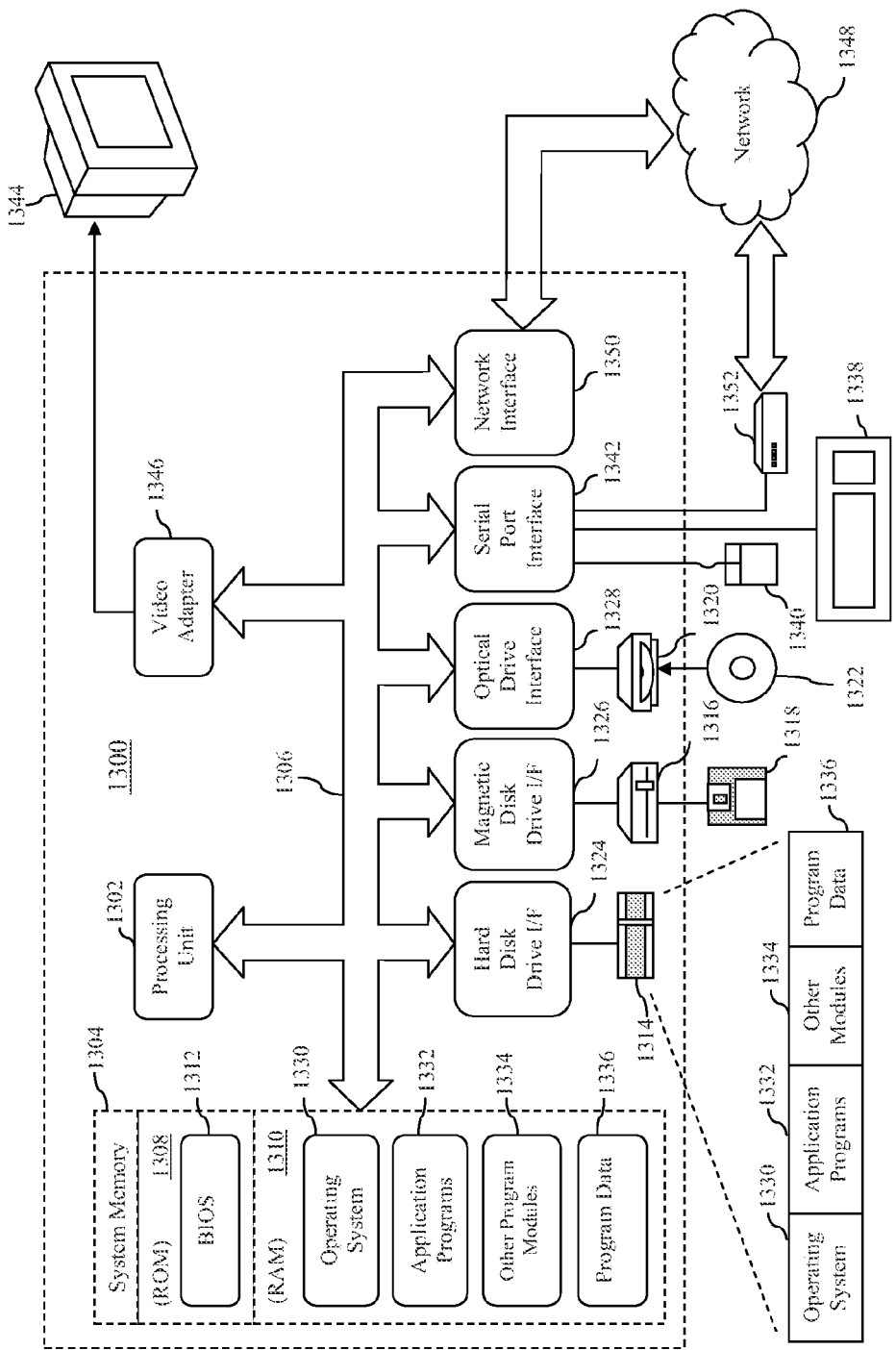
FIG. 13 is a block diagram of an example processor-based system that may be used to implement various embodiments.

FIG. 13 depicts an example processor-based computer system 1300 that may be used to implement various embodiments described herein. For example, system 1300 may be used to implement client 102, database server 104a, database server 104b, client 200, and/or database server 300, as well as various sub-components thereof. The description of system 1300 provided herein is provided for purposes of illustration, and is not intended to be limiting. Embodiments may be implemented in further types of computer systems, as would be known to persons skilled in the relevant art(s).

As shown in FIG. 13, system 1300 includes a processing unit 1302, a system memory 1304, and a bus 1306 that couples various system components including system memory 1304 to processing unit 1302. Processing unit 1302 may comprise one or more processors or processing cores. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

System 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, BLU-RAY™ disk or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1330, one or more application programs 1332, other program modules 1334, and program data 1336. In accordance with various embodiments, the program modules may include computer program logic (e.g., computer code or instructions) that is executable by processing unit 1302 to perform any or all of the functions and features of client 102, database server 104a, database server 104b, command generator 112, session manager 114a, session manager 114b, transaction log manager 116a, transaction log manager 116b, client 200, application 202, database driver 204, API 212, session ID generator 328, transaction ID generator 330, command ID generator 218, parser 220, protocol layer 222, database server 300, session manager 302, engine 304, transaction log manager 306, remote replicated session state handler 308, parser 310, protocol layer 312, session ID comparer 702, transaction ID comparer 704, command ID comparer 706, entity 1204, flowchart 400, flowchart 500, flowchart 600, step 902, and/or flowchart 1000 (including any step of flowcharts 400, 500, 600, and 1000), and/or further embodiments described elsewhere herein.

A user may enter commands and information into system 1300 through input devices such as a keyboard 1338 and a pointing device 1340. Other input devices (not shown) may include a microphone, joystick, game pad, game controller, scanner, touch screen and/or touch pad, a voice recognition system to receive voice input, a gesture recognition system to receive gesture input, or the like. In one embodiment, a touch screen is provided in conjunction with a display 1344 to allow a user to provide user input via the application of a touch (as by a finger or stylus for example) to one or more points on the touch screen. These and other input devices are often connected to processing unit 1302 through a serial port interface 1342 that is coupled to bus 1306, but may be connected by other interfaces, such as a parallel port, game port, or a universal serial bus (USB).

A display 1344 is also connected to bus 1306 via an interface, such as a video adapter 1346. In addition to display 1344, system 1300 may include other peripheral output devices (not shown) such as speakers and printers.

System 1300 is connected to a network 1348 (e.g., a local area network or wide area network such as the Internet) through a network adaptor or interface 1350, a modem 1352, or other suitable means for establishing communications over the network. Modem 1352, which may be internal or external, is connected to bus 1306 via serial port interface 1342.

As used herein, the terms "computer program medium" and "computer-readable medium" are used to generally refer to physical media such as ROM 1308 and RAM 1310 used to implement system memory 1304, the hard disk associated with hard disk drive 1314, removable magnetic disk 1318, removable optical disk 1322, as well as other media such as flash memory cards, digital video disks, and the like.

As noted above, computer programs and modules (including application programs 1332 and other program modules 1334) may be stored on ROM 1308, RAM 1310, the hard disk associated with hard disk drive 1314, the removable magnetic disk 1318, or the removable optical disk 1322. Such computer programs may also be received via network interface 1350 or serial port interface 1342. Such computer programs, when executed by processing unit 1302, enable system 1300 to implement features of embodiments discussed herein. Accordingly, such computer programs represent controllers of system 1300.

As used herein, the terms "computer program medium," "computer-readable medium," and "computer-readable storage medium" are used to generally refer to media such as the hard disk associated with hard disk drive 1314, removable magnetic disk 1318, removable optical disk 1322, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1332 and other program modules 1334) may be stored on the hard disk, magnetic disk, optical disk, ROM, or RAM. Such computer programs may also be received via network interface 1350, serial port interface 1342, or any other interface type. Such computer programs, when executed or loaded by an application, enable system 1300 to implement features of embodiments of the present invention discussed herein. Accordingly, such computer programs represent controllers of the system 1300.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a database server, comprising:
   performing by the database server:
   establishing a first session with a client to handle a database query for the client;
   opening a transaction of the first session to execute a plurality of commands associated with the transaction for the client;
   receiving at least one command associated with the transaction from the client, each received command being received with an associated command identifier;
   generating a transaction log that stores the command identifier associated with each received command and indicates whether each received command has been successfully executed;
   receiving a request to reestablish the first session, a further command associated with the transaction, and a command identifier for the further command from the client after a failure in the first session;
   reestablishing the first session with the client;
   determining whether a command identifier for the further command has already been stored in the transaction log; and
   if the command identifier associated with the further command is determined to not already have been stored in the transaction log,
   attempting to execute the further command, and
   annotating the transaction log with the command identifier associated with the further command and an indication of whether the further command has been successfully executed.

2. The method of claim 1, further comprising:
   receiving a commit instruction for the transaction from the client; and
   committing the transaction.

3. The method of claim 1, wherein if the command identifier associated with the received further command was determined to have already been stored in the transaction log upon said receiving the further command, performing the steps of:
   determining from the transaction log that the previously-received command having the command identifier determined to have already been stored in the transaction log was executed successfully; and
   avoiding re-executing the previously-received command.

4. The method of claim 1, further comprising:
   undergoing the failure in the first session due to a failure in a connection between the client and the database server during the first session or a failure in the database server.

5. The method of claim 1, wherein said establishing a first session with a client comprises:
   storing a session identifier for the first session in a session state;

said generating a transaction log comprises:
storing the transaction log in the session state; and
said reestablishing the first session with the client comprises:
receiving the session identifier from the client in a communication transmitted to the database server to reestablish the first session, and
determining that the session identifier received in the communication matches the session identifier stored in the session state.

6. The method of claim 5, further comprising:
replicating the session state to at least one additional database server, the replicated session state enabling the at least one additional database server to continue the transaction if the first session fails.

7. The method of claim 1, further comprising:
deleting the transaction log after a predetermined amount of time expires after the failure of the first session if a communication is not received from the client requesting to reestablish the first session.

8. A method, comprising:
receiving a replicated session state from a first database server at a second database server, the replicated session state being a copy of a session state generated at the first database server to handle a database query for a client, the replicated session state including a session identifier and a transaction log associated with a transaction, the transaction log storing one or more command identifiers associated with one or more commands received at the first database server from the client within the transaction, and indicating whether each received command has been successfully executed;
receiving a request at the second database server from a client to establish a session with the client due to a failure in a first session established between the client and the first database server;
determining that a session identifier included in the request matches the session identifier included in the replicated session state;
reestablishing a second session with the client at the second database server;
receiving a further command associated with the transaction from the client at the second database server;
determining whether a command identifier for the further command has already been stored in the transaction log; and
if the command identifier associated with the further command is determined to not already have been stored in the transaction log,
attempting to execute the further command, and
annotating the transaction log with the command identifier associated with the further command and an indication of whether the further command has been successfully executed.

9. The method of claim 8, further comprising:
receiving a commit instruction for the transaction from the client; and
committing the transaction.

10. The method of claim 8, wherein if the command identifier associated with the received further command was determined to have already been stored in the transaction log upon said receiving the further command, performing the steps of:
determining from the transaction log that the received further command having the command identifier determined to have already been stored in the transaction log was executed successfully, and
avoiding re-executing the previously-received command.

11. The method of claim 8, further comprising:
deleting the transaction log after a predetermined amount of time expires after a failure of the second session if a communication is not received from the client requesting to reestablish the first session.

12. The method of claim 8, wherein said reestablishing comprises:
storing an indication of the reestablished session.

13. A system, comprising:
a first database server that includes
a session manager that establishes a first session with a client to handle a database query for the client, opens a transaction of the first session to execute a plurality of commands associated with the transaction for the client, and receives at least one command associated with the transaction from the client, each received command being received with an associated command identifier, and
a transaction log manager that generates a transaction log that stores the command identifier associated with each received command and indicates whether each received command has been successfully executed;
the session manager receives a request to reestablish the first session, a further command associated with the transaction, and a command identifier for the further command from the client after a failure in the first session;
the session manager reestablishes the first session with the client, and determines whether a command identifier for the further command has already been stored in the transaction log; and
if the session manager determines that the command identifier associated with the further command was not already stored in the transaction log, the further command is attempted to be executed, and the transaction log manager annotates the transaction log with the command identifier associated with the further command and an indication of whether the further command has been successfully executed.

14. The system of claim 13, wherein the session manager receives a commit instruction for the transaction from the client, and commits the transaction in response to the received commit instruction.

15. The system of claim 13, wherein upon receiving the further command, if the session manager determines that command identifier associated with the received further command was already stored in the transaction log, and if the session manager determines from the transaction log that the received further command having the command identifier determined to already be stored in the transaction log was executed successfully, the received further command is not re-executed.

16. The system of claim 13, wherein the transaction log manager deletes the transaction log after a predetermined amount of time expires after the failure of the first session if a communication is not received from the client requesting to reestablish the first session.

17. The system of claim 13, wherein to establish the first session the session manager stores a session identifier for the first session in a session state, and transmits a session established indication to the client;
the transaction log manager stores the transaction log in the session state; and
to reestablish the first session with the client, the session manager receives the session identifier from the client in a communication transmitted to the database server to reestablish the first session and determines that the session identifier received in the communication matches the session identifier stored in the session state.

18. The system of claim 17, wherein the second session manager replicates the session state to at least one additional database server, the replicated session state enabling the at least one additional database server to continue the transaction if the first session fails.

19. The system of claim 18, further comprising:
a second database server that includes
 a remote replicated session state handler that receives the replicated session state from the first database server, and
 a second session manager that receives a request from the client to establish a second session with the client due to the first session having failed, determines that a session identifier included in the request from the client to establish the second session matches the session identifier included in the replicated session state, establishes the second session with the client at the second database server, receives a further command associated with the transaction from the client, and determines whether a command identifier for the further command has already been stored in the transaction log.

20. The system of claim 19, wherein the second database server further comprises:
a second transaction log manager; and
 if the command identifier associated with the further command is determined by the second session manager to not already have been stored in the transaction log, the further command is attempted to be executed at the second database server, and the second transaction log manager annotates the transaction log with the command identifier associated with the further command and an indication of whether the further command has been successfully executed.

* * * * *